(12) United States Patent
Tsuboi et al.

(10) Patent No.: US 12,490,327 B2
(45) Date of Patent: Dec. 2, 2025

(54) TERMINAL APPARATUS, BASE STATION APPARATUS, METHOD, AND INTEGRATED CIRCUIT

(71) Applicant: SHARP KABUSHIKI KAISHA, Sakai (JP)

(72) Inventors: Hidekazu Tsuboi, Sakai (JP); Shohei Yamada, Sakai (JP); Takako Hori, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 381 days.

(21) Appl. No.: 18/018,874

(22) PCT Filed: Aug. 3, 2021

(86) PCT No.: PCT/JP2021/028766
§ 371 (c)(1),
(2) Date: Jan. 31, 2023

(87) PCT Pub. No.: WO2022/030487
PCT Pub. Date: Feb. 10, 2022

(65) Prior Publication Data
US 2023/0328817 A1    Oct. 12, 2023

(30) Foreign Application Priority Data
Aug. 6, 2020   (JP) ................. 2020-133692

(51) Int. Cl.
*H04W 76/15*   (2018.01)
*H04W 72/232*   (2023.01)
*H04W 76/20*   (2018.01)

(52) U.S. Cl.
CPC ......... *H04W 76/15* (2018.02); *H04W 72/232* (2023.01); *H04W 76/20* (2018.02)

(58) Field of Classification Search
CPC ..... H04W 76/15; H04W 76/20; H04W 76/27; H04W 76/18; H04W 76/25; H04W 76/34;
(Continued)

(56) References Cited

U.S. PATENT DOCUMENTS 11,368,206 B2 *   6/2022   Chen ................. H04B 7/088
11,388,755 B2 *   7/2022   Cirik ................. H04W 72/23
(Continued)

FOREIGN PATENT DOCUMENTS

WO   2019/184629 A1   10/2019

OTHER PUBLICATIONS

NTT Docomo, Inc., "New WID on New Radio Access Technology", RP-170855, 3GPP TSG RAN Meeting #75, Dubrovnik, Croatia, Mar. 6-9, 2017.
(Continued)

*Primary Examiner* — Man U Phan
(74) *Attorney, Agent, or Firm* — ScienBiziP, P.C.

(57) ABSTRACT

A terminal apparatus receives a first configuration and a second configuration that are applied to a second cell group and first information. The terminal apparatus performs reconfiguration using the first configuration in a case of receiving a first value as the first information. The terminal apparatus performs reconfiguration using the second configuration in a case of receiving a second value as the first information. The terminal apparatus does not reset MAC and reestablishes RLC in the second cell group in a case of performing reconfiguration based on the first information.

3 Claims, 12 Drawing Sheets

(58) Field of Classification Search
CPC ..... H04W 76/38; H04W 76/19; H04W 76/11; H04W 72/23; H04W 72/04; H04W 72/12; H04W 72/50; H04W 24/08; H04W 24/10; H04W 28/02; H04W 36/08; H04W 36/18; H04W 36/00; H04W 48/16; H04W 56/00; H04W 52/36; H04W 80/02; H04B 7/06; H04L 5/00
USPC ........................................................ 370/329
See application file for complete search history.

(56) References Cited

U.S. PATENT DOCUMENTS

| | | | | |
|---|---|---|---|---|
| 11,582,784 | B2* | 2/2023 | Tsai | H04L 5/001 |
| 11,706,081 | B2* | 7/2023 | Jiang | H04B 7/0695 |
| | | | | 370/216 |
| 11,825,364 | B2* | 11/2023 | Cirik | H04W 36/0072 |
| 11,968,679 | B2* | 4/2024 | Cirik | H04L 25/0224 |
| 12,120,572 | B2* | 10/2024 | Ozturk | H04W 76/19 |
| 12,126,577 | B2* | 10/2024 | Svedman | H04W 8/22 |
| 12,133,201 | B2* | 10/2024 | Agiwal | H04W 76/27 |
| 12,149,317 | B2* | 11/2024 | Svedman | H04B 7/06964 |
| 2021/0013951 | A1 | 1/2021 | Chen et al. | |
| 2021/0307055 | A1* | 9/2021 | Tsai | H04W 76/30 |
| 2024/0322891 | A1* | 9/2024 | Cirik | H04L 1/188 |

OTHER PUBLICATIONS

3GPP TS 23.501 V15.3.0 (Sep. 2018) Brd Generation Partnership Project; Technical Specification Group Services and System Aspects; System Architecture for the 5G System; Stage 2 (Release 15).
Ericsson et al., "WID on Multi-RAT Dual-Connectivity and Carrier Aggregation enhancements", RP-182076, 3GPP TSG-RAN#81, Gold Coast, Australia, Sep. 10-13, 2018.
3GPP TS 36.300 V15.3.0 (Sep. 2018) Brd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15).
3GPP TS 38.300 V15.3.0 (Sep. 2018) Brd Generation Partnership Project; Technical Specification Group Radio Access Network; NR; NR and NG-RAN Overall Description; Stage 2 (Release 15).
3GPP TS 36.321 V15.3.0 (Sep. 2018) 3rd Generation Partnership Project; Technical Specification Group Radio Access Network; Evolved Universal Terrestrial Radio Access (E-UTRA); Medium Access Control (MAC) protocol specification (Release 15).
3GPP TS 38.321 V15.3.0 (Sep. 2018) 3rd Generation Partnership Project; Technical Specification Group Radio Access Network; NR; Medium Access Control (MAC) protocol specification (Release 15).
3GPP TS 36.331 V15.4.0 (Dec. 2018) 3rd Generation Partnership Project; Technical Specification Group Radio Access Network; Evolved Universal Terrestrial Radio Access (E-UTRA); Radio Resource Control (RRC); Protocol specification (Release 15).
3GPP TS 38.331 V15.4.0 (Dec. 2018) 3rd Generation Partnership Project; Technical Specification Group Radio Access Network; NR; Radio Resource Control (RRC) protocol specification (Release 15).
Nokia et al., "Suspension of SCG", R2-1906692, 3GPP TSG-RAN WG2 Meeting #106, Reno, USA, May 13, 2019-May 17, 2019, [retrieved on May 13, 2019].

* cited by examiner

```
RRCReconfiguration ::=        SEQUENCE {
<PARTLY OMITTED>
    radioBearerConfig           RadioBearerConfig                                         OPTIONAL,    -- Need M
    secondaryCellGroup          OCTET STRING (CONTAINING CellGroupConfig)                 OPTIONAL,    -- Need M
    masterCellGroup             OCTET STRING (CONTAINING CellGroupConfig)                 OPTIONAL,    -- Need M
    mrdc-SecondaryCellGroupConfig  SetupRelease { MRDC-SecondaryCellGroupConfig }         OPTIONAL,    -- Need M
<PARTLY OMITTED>
}

MRDC-SecondaryCellGroupConfig ::= SEQUENCE {
    mrdc-ReleaseAndAdd          ENUMERATED {true}                                         OPTIONAL,    -- Need N
    mrdc-SecondaryCellGroup     CHOICE {
        nr-SCG                      OCTET STRING (CONTAINING RRCReconfiguration),
        eutra-SCG                   OCTET STRING
    }
}

CellGroupConfig ::=           SEQUENCE {
    cellGroupId                 CellGroupId,
<PARTLY OMITTED>
    mac-CellGroupConfig         MAC-CellGroupConfig                                       OPTIONAL,    -- Need M
    spCellConfig                SpCellConfig                                              OPTIONAL,    -- Need M
    sCellToAddModList           SEQUENCE (SIZE (1..maxNrofSCells)) OF SCellConfig         OPTIONAL,    -- Need N
    sCellToReleaseList          SEQUENCE (SIZE (1..maxNrofSCells)) OF SCellIndex          OPTIONAL,    -- Need N
<PARTLY OMITTED>
}
```

FIG. 7

```
RRCConnectionReconfiguration ::=  SEQUENCE {
    <PARTLY OMITTED>
    sCellToReleaseList-r10          SCellToReleaseList-r10          OPTIONAL,  -- Need ON
    sCellToAddModList-r10           SCellToAddModList-r10           OPTIONAL,  -- Need ON
    scg-Configuration-r12           SCG-Configuration-r12           OPTIONAL,  -- Cond nonFullConfig
    <PARTLY OMITTED>
}

PSCellToAddMod-r12 ::=  SEQUENCE {
    sCellIndex-r12          SCellIndex-r10,
    cellIdentification-r12  SEQUENCE {
    <PARTLY OMITTED>
    }
    OPTIONAL,   -- Cond SCellAdd
    <PARTLY OMITTED>
}

SCellToAddModList-r10 ::=  SEQUENCE (SIZE (1..maxSCell-r10)) OF SCellToAddMod-r10
SCellToAddMod-r10 ::=  SEQUENCE {
    sCellIndex-r10          SCellIndex-r10,
    cellIdentification-r10  SEQUENCE {
    <PARTLY OMITTED>
    }
    OPTIONAL,   -- Cond SCellAdd
    <PARTLY OMITTED>
}

SCG-Configuration-r12 ::=  CHOICE {
    release     NULL,
    setup       SEQUENCE {
    <PARTLY OMITTED>
        scg-ConfigPartSCG-r12       SCG-ConfigPartSCG-r12           OPTIONAL    -- Need ON
    }
}

SCG-ConfigPartSCG-r12 ::=  SEQUENCE {
    <PARTLY OMITTED>
    sCellToReleaseListSCG-r12       SCellToReleaseList-r10          OPTIONAL,  -- Need ON
    pSCellToAddMod-r12              PSCellToAddMod-r12              OPTIONAL,  -- Need ON
    sCellToAddModListSCG-r12        SCellToAddModList-r10           OPTIONAL,  -- Need ON
    <PARTLY OMITTED>
}
```

FIG. 8

TERMINAL APPARATUS, BASE STATION APPARATUS, METHOD, AND INTEGRATED CIRCUIT

TECHNICAL FIELD

The present invention relates to a terminal apparatus, a base station apparatus, a method, and an integrated circuit.

This application claims priority based on JP 2020-133692 filed on Aug. 6, 2020, the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (EUTRA)") and a core network (which will be referred to as "Evolved Packet Core (EPC)") have been studied by the 3rd Generation Partnership Project (3GPP). EUTRA is also referred to as E-UTRA.

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (NPL 1). Furthermore, 5 Generation Core Network (5GC), which is a core network for the 5th generation cellular system, has also been studied (NPL 2).

CITATION LIST

Non Patent Literature

NPL 1: 3GPP RP-170855, "Work Item on New Radio (NR) Access Technology"
NPL 2: 3GPP TS 23.501 v15.3.0, "System Architecture for the 5G System; Stage 2"
NPL 3: 3GPP RP-182076, "WID on Multi-RAT Dual-Connectivity and Carrier Aggregation enhancements"
NPL 4: 3GPP TS 36.300, v15.3.0, "Evolved Universal Terestrial Radio Access (E-UTRA) and Evolved Universal Terestrial Radio Access Network (E-UTRAN); Overall description; Stage 2"
NPL 5: 3GPP TS 38.300v15.3.0, "NR; NR and NG-RAN Overall description; Stage 2"
NPL 6: 3GPP TS 36.321 v15.3.0, "Evolved Universal Terestrial Radio Access (E-UTRA); Medium Access Control (MAC) protocol specification"
NPL 7: 3GPP TS 38.321 v15.3.0, "NR; Medium Access Control (MAC) protocol specification"
NPL 8: 3GPP TS 36.331 v15.4.0, "Evolved Universal Terestrial Radio Access (E-UTRA); Radio Resource Control (RRC); Protocol specifications"
NPL 9: 3GPP TS 38.331 v15.4.0, "NR; Radio Resource Control (RRC); Protocol specifications"

SUMMARY OF INVENTION

Technical Problem

As one technology of NR, in order to enable data communication of large capacity, there is a dual connectivity (also referred to as multi-connectivity) technology, in which one or multiple base station apparatuses and a terminal apparatus communicate with each other using multiple cell groups. In dual connectivity, in order to perform communication in each of the cell groups, the terminal apparatus needs to monitor whether or not there is a message addressed to the terminal apparatus itself in each of the cell groups. There is a problem in that the terminal apparatus needs to constantly perform monitoring of multiple cell groups so as to be able to communicate with low delay in a case that data communication of large capacity occurs, and accordingly consumes much power. Thus, a study of a technology (cell group dormancy (Dormant) technology) has been started, in which monitoring of a part of the cell groups is performed in low frequencies or is stopped (NPL 3).

In dormancy of the cell groups, at the moment, how to cope with a cell (SpCell) that is constantly in an activate state has been under study.

An aspect of the present invention is made in view of the circumstances described above, and has an object to provide a terminal apparatus, a base station apparatus, a method, and an integrated circuit that enable efficient communication control.

Solution to Problem (1) In order to accomplish the object described above, an aspect of the present invention is contrived to provide the following means. Specifically, a first aspect of the present invention is a terminal apparatus configured with a first cell group and a second cell group, the terminal apparatus including: a receiver configured to receive a first configuration applied to the second cell group and receive a second configuration applied to the second cell group; a retainer configured to retain the first configuration and the second configuration that are applied to the second cell group in a case that the second configuration applied to the second cell group is received; and a controller configured to perform radio resource control, wherein the receiver receives first information, and the controller performs reconfiguration using the first configuration in a case that a first value is received as the first information, performs reconfiguration using the second configuration in a case that a second value is received as the first information, and does not reset MAC and reestablishes RLC in the second cell group in a case of performing reconfiguration based on the first information.

(2) A second aspect of the present invention is a base station apparatus for communicating with a terminal apparatus, the base station apparatus including: a transmitter configured to transmit a first configuration applied to a second cell group and transmit a second configuration applied to the second cell group; and a controller configured to perform radio resource control, wherein the transmitter transmits first information, and the controller transmits a first value as the first information to thereby cause the terminal apparatus to perform reconfiguration using the first configuration, transmits a second value as the first information to cause the terminal apparatus to perform reconfiguration using the second configuration, and performs the radio resource control on an assumption that the terminal apparatus does not reset MAC and reestablishes RLC in the second cell group, in a case of causing the terminal apparatus to perform reconfiguration based on the first information.

(3) A third aspect of the present invention is a method applied to a terminal apparatus configured with a first cell group and a second cell group, the method including: receiving a first configuration applied to the second cell group, receiving a second configuration applied to the second cell group, and receiving first information; retaining the first configuration and the second configuration that are applied to the second cell group in a case that the second configuration applied to the second cell group is received; and performing radio resource control, wherein reconfiguration using the first configuration is performed in a case that a first value is received as the first information, reconfiguration using the second configuration is performed in a case that a second value is received as the first information, and MAC is not reset and RLC is reestablished in the second cell group, in a case that reconfiguration based on the first information is performed.

(4) A fourth aspect of the present invention is a method applied to a base station apparatus for communicating with a terminal apparatus, the method including: transmitting a first configuration applied to a second cell group, transmitting a second configuration applied to the second cell group, and transmitting first information; and performing radio resource control, wherein a first value is transmitted as the first information to cause the terminal apparatus to perform reconfiguration using the first configuration, a second value is transmitted as the first information to cause the terminal apparatus to perform reconfiguration using the second configuration, and the radio resource control is performed on an assumption that the terminal apparatus does not reset MAC and reestablishes RLC in the second cell group, in a case that the terminal apparatus is caused to perform reconfiguration based on the first information.

(5) A fifth aspect of the present invention is an integrated circuit implemented in a terminal apparatus configured with a first cell group and a second cell group, the integrated circuit causing the terminal apparatus to perform: receiving a first configuration applied to the second cell group, receiving a second configuration applied to the second cell group, and receiving first information; retaining the first configuration and the second configuration that are applied to the second cell group in a case that the second configuration applied to the second cell group is received; and performing radio resource control, wherein reconfiguration using the first configuration is performed in a case that a first value is received as the first information, reconfiguration using the second configuration is performed in a case that a second value is received as the first information, and MAC is not reset and RLC is reestablished in the second cell group in a case that reconfiguration based on the first information is performed.

(6) A sixth aspect of the present invention is an integrated circuit implemented in a base station apparatus for communicating with a terminal apparatus, the integrated circuit causing the base station apparatus to perform: transmitting a first configuration applied to a second cell group, transmitting a second configuration applied to the second cell group, and transmitting first information; and performing radio resource control, wherein a first value is transmitted as the first information to cause the terminal apparatus to perform reconfiguration using the first configuration, a second value is transmitted as the first information to cause the terminal apparatus to perform reconfiguration using the second configuration, and the radio resource control is performed on an assumption that the terminal apparatus does not reset MAC and reestablishes RLC in the second cell group, in a case that the terminal apparatus is caused to perform reconfiguration based on the first information.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus can implement efficient communication control processing.

BRIEF DESCRIPTION OF DRAWINGS

FIG. 7 is an example of information elements related to a cell group configuration in NR according to an embodiment of the present invention.

FIG. 8 is an example of information elements related to a cell group configuration in E-UTRA according to an embodiment of the present invention.

DESCRIPTION OF EMBODIMENTS

Hereinafter, an embodiment of the present invention will be described in detail with reference to the drawings.

LTE (and LTE-A Pro) and NR may be defined as different Radio Access Technologies (RATs). The LTE that is connectible to the NR by using Multi Radio Dual connectivity may be distinguished from the existing LTE. The LTE in which a 5GC is used as a core network may be distinguished from a conventional LTE, where an EPC is used as a core network. The present embodiment may be applied to the NR, the LTE and other RATs. Terms associated with LTE and NR are used in the following description. However, the present embodiment may be applied to other technologies using other terms. In the present embodiment, the term "E-UTRA" may be replaced with "LTE," and the term "LTE" may be replaced with "E-UTRA."

Figure 1:
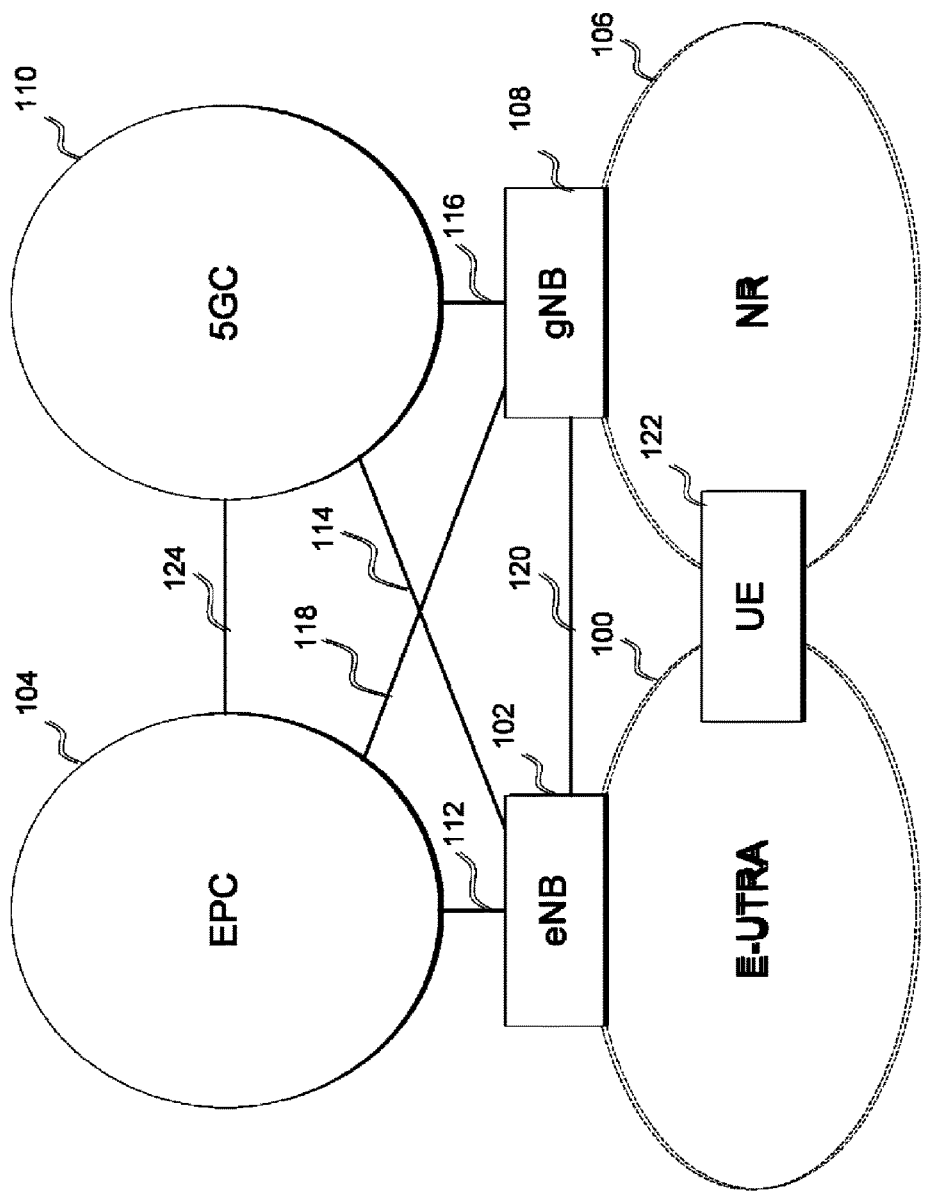
FIG. 1 is a schematic diagram of a communication system according to each embodiment of the present invention.

FIG. 1 is a schematic diagram of a communication system according to each embodiment of the present invention.

An E-UTRA 100 is a radio access technology described in NPL 4 or the like, and includes a cell group (CG) configured in one or multiple frequency bands. An E-UTRAN Node B (eNB) 102 is a base station apparatus of the E-UTRA 100. An Evolved Packet Core (EPC) 104 is a core network described in NPL 14 and the like and is designed as a core network for the E-UTRA 100. An interface 112 is an interface between the eNB 102 and the EPC 104, where there is a control plane (CP) through which control signals are transferred and a user plane (UP) through which user data is transferred.

An NR 106 is a radio access technology described in NPL 5 and the like, and includes a cell group (CG) including one or multiple frequency bands. A gNodeB (gNB) 108 is a base station apparatus in the NR 106. A 5GC 110 is a core network described in NPL 2 and the like, and is designed as a core network for the NR 106, but may also be used as a core network used for the E-UTRA 100 and including a function to connect to the 5GC 110. Hereinafter, the E-UTRA 100 may include the E-UTRA 100 including a function to connect to the 5GC 110.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, the interface 124, and the like may be interfaces that allow a CP only, an UP only, or both the CP and UP to pass through. The interface 114, the interface 116, the interface 118, the interface 120, the interface 124, and the like may be absent depending on a communication system provided by a network operator.

A UE 122 is a terminal apparatus supporting one or all of the E-UTRA 100 and the NR 106. As described in one or all of NPL 4 and NPL 5, in a case that the UE 122 connects to a core network via one or all of the E-UTRA 100 and the NR 106, a logical path called a radio bearer (RB) is established between the UE 122 and one or all of the E-UTRA 100 and the NR 106. The radio bearer used for the CP is referred to as a Signaling Radio Bearer (SRB), and the radio bearer used for the UP is referred to as a Data Radio Bearer (DRB).

Figure 2:
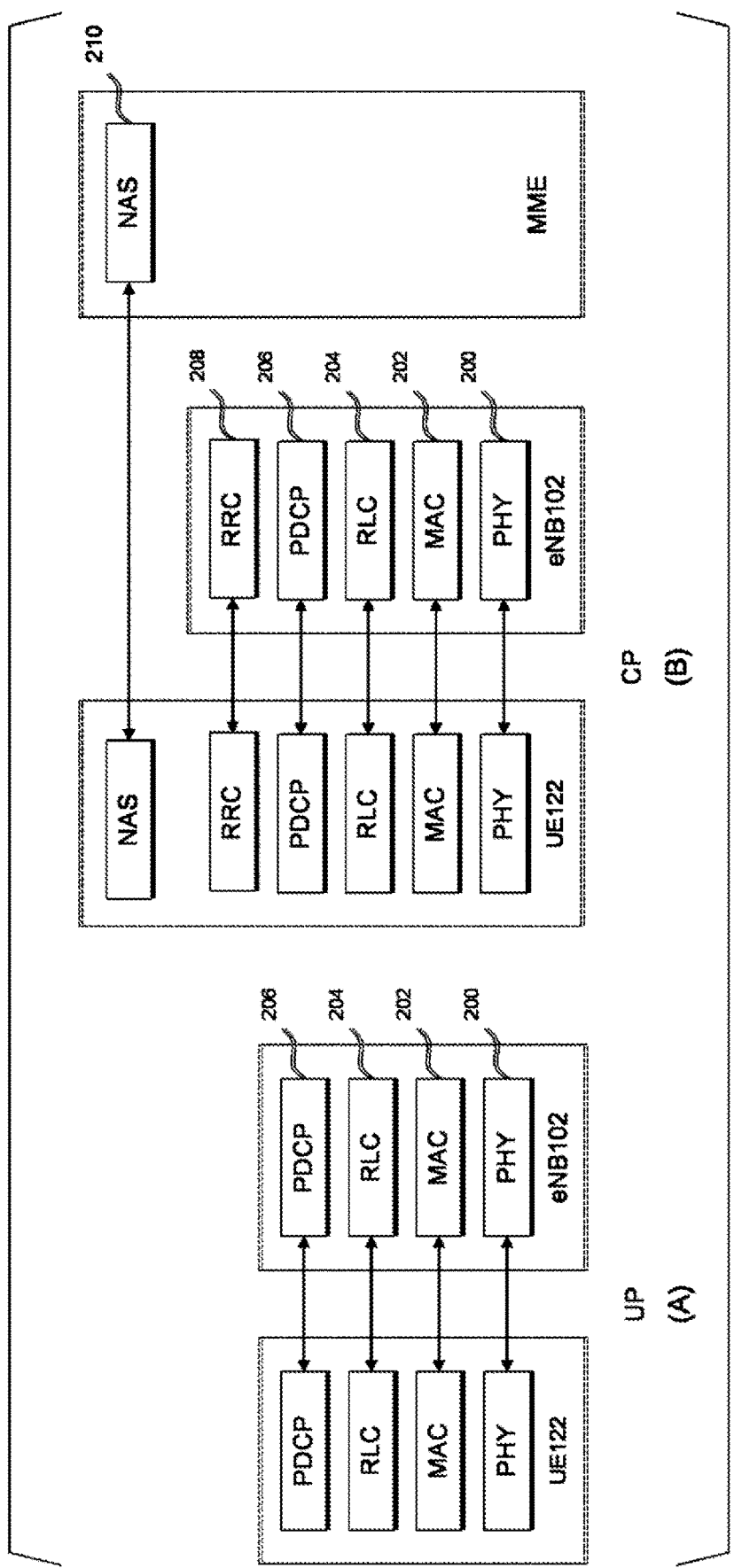
FIG. 2 is a diagram of protocol stacks of a UP and a CP of a terminal apparatus and a base station apparatus in E-UTRA according to each embodiment of the present invention.

FIG. 2 is a diagram of protocol stacks of UP and CP of a terminal apparatus and a base station apparatus in an E-UTRA radio access layer according to each embodiment of the present invention.

FIG. 2(A) is a diagram of a protocol stack of the UP used in a case that the UE 122 communicates with the eNB 102 in the E-UTRA 100.

A Physical layer (PHY) 200 is a radio physical layer and provides a transmission service to an upper layer by using a physical channel. The PHY 200 is connected with a Medium Access Control layer (MAC) 202 of an upper layer to be described below via transport channels. Data is exchanged between the MAC 202 and the PHY 200 via the transport channels. The data is transmitted and/or received via radio physical channels between the PHYs of the UE 122 and the eNB 102.

The MAC 202 is a medium access control layer that maps various logical channels to various transport channels. The MAC 202 is connected with a radio link control layer (RLC) 204 of an upper layer to be described below via logical channels. The major classifications of the logical channel depend on the type of information to be transmitted, specifically, the logical channels are classified into control channels for transmitting control information and traffic channels for transmitting user information. The MAC 202 may have a function of controlling the PHY 200 in order to perform the Discontinuous Reception and Transmission (DRX and DTX), a function of performing the Random Access procedure, a function of reporting transmit power information, a function of performing HARQ control, and the like. The MAC 302 may have a function of controlling an activated state of a cell configured in an RRC layer (NPL 6).

The RLC 204 is a radio link control layer that segments data received from a Packet Data Convergence Protocol Layer (PDCP) 206 corresponding to an upper layer to be described below, and adjusts the data size such that a lower layer can properly transmit the data.

The PDCP 206 is a packet data convergence protocol layer for efficiently transmitting user data, such as IP packets, in wireless sections. The PDCP 206 may include a header compression function to compress control information. Additionally, the PDCP 206 may also include a data ciphering function.

Note that data processed in the MAC 202, the RLC 204, and the PDCP 206 are referred to as a MAC Protocol Data Unit (PDU), an RLC PDU, and a PDCP PDU, respectively. In addition, data delivered from an upper layer to the MAC 202, the RLC 204, and the PDCP 206 or data delivered therefrom to an upper layer are respectively referred to as a MAC Service Data Unit (SDU), an RLC SDU, and a PDCP SDU. A segmented RLC SDU is referred to as an RLC SDU segment.

FIG. 2(B) is a protocol stack diagram of the CP used by the UE 122 in communicating with the eNB 102 and a Mobility Management Entity (MME) used as a logical node providing functions such as authentication and mobility management in the E-UTRA 100.

In the protocol stack of the CP, a Radio Resource Control layer (RRC) 208 and a non Access Strarum (NAS) 210 are present in addition to the PHY 200, the MAC 202, the RLC 204, and the PDCP 206. The RRC 208 is a radio link control layer that performs processing such as establishment, re-establishment, suspension, resumption, and the like of an RRC connection, reconfiguration of the RRC connection, for example, configuration of the radio bearer (RB) and the cell group such as establishment, change, or release, control of logical channels, transport channels, and physical channels, and the like, and further performs configuration of handover and measurement, and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between the RRCs 208 of the eNB 102 and the UE 122. A portion of the RB including the RLC 204 and the logical channel may be referred to as an RLC bearer. In contrast to a NAS layer for carrying signals between the MME and the UE 122, a part of layers or all of layers of the PHY 200, the MAC 202, the RLC 204, the PDCP 206, and the RRC 208 for carrying signals and data between the UE 122 and the eNB 102 may be referred to as an Access Strarum (AS) layer.

The functional classification of the MAC 202, the RLC 204, the PDCP 206, and the RRC 208 described above is an example, and some or all of the respective functions may not be implemented. Some or all of the functions of each layer may be included in another layer.

Note that an IP layer and a Transmission Control Protocol (TCP) layer, a User Datagram Protocol (UDP) layer, an application layer, and the like, which are upper layers than the IP layer, are upper layers than a PDCP layer (not illustrated). An RRC layer and a non Access Strarum (NAS) layer are also upper layers than the PDCP layer (not illustrated). In other words, the PDCP layer is a lower layer than the RRC layer, the NAS layer, the IP layer, and the Transmission Control Protocol (TCP) layer, the User Datagram Protocol (UDP) layer, and the application layer, which are upper layers than the IP layer.

Figure 3:
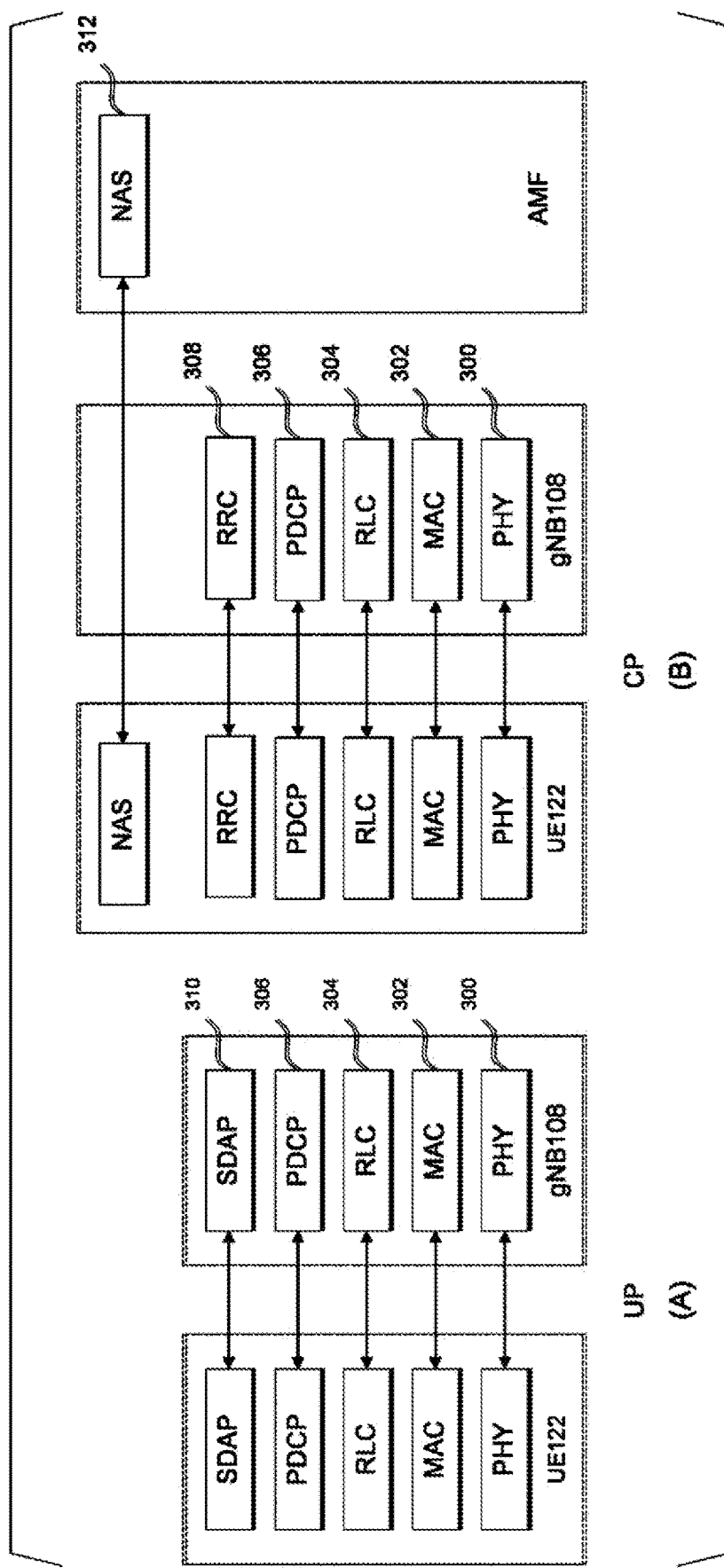
FIG. 3 is a diagram of protocol stacks of the UP and the CP of the terminal apparatus and the base station apparatus in NR according to each embodiment of the present invention.

FIG. 3 is a diagram of protocol stacks of UP and CP of a terminal apparatus and a base station apparatus in an NR radio access layer according to each embodiment of the present invention.

FIG. 3(A) is a diagram of the protocol stack of the UP used by the UE 122 in communicating with the gNB 108 in the NR 106.

A Physical layer (PHY) 300 is a radio physical layer of the NR and may provide a transmission service to an upper layer by using a physical channel. The PHY 300 may be connected with the Medium Access Control layer (MAC) 302 of an upper layer to be described below via the transport channels. Data may be exchanged between the MAC 302 and the PHY 300 via the transport channels. The data may be transmitted and/or received between the PHYs of the UE 122 and the gNB 108 via the radio physical channel.

Now, the physical channels will be described.

The following physical channels may be used for the radio communication between the terminal apparatus and the base station apparatus.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast system information required by the terminal apparatuses.

The PBCH may be used to broadcast time indexes (SSB-Indexes) within the periodicity of synchronization signal blocks (also referred to as SS/PBCH blocks) in NR.

The PDCCH is used to transmit (or carry) downlink control information (DCI) in a case of downlink radio communication (radio communication from the base station apparatus to the terminal apparatus). Here, one or multiple pieces of DCI (which may be referred to as DCI formats) are defined for transmission of the downlink control information. In other words, a field for the downlink control information is defined as DCI and is mapped to information bits. The PDCCH is transmitted in a PDCCH candidate. The terminal apparatus monitors a set of PDCCH candidates in the serving cell. The monitoring means an attempt to decode the PDCCH in accordance with a certain DCI format. The certain DCI format may be used for scheduling of the PUSCH in the serving cell. The PUSCH may be used for transmission of user data, transmission of RRC messages, and the like.

The PUCCH is used to transmit Uplink Control Information (UCI) in a case of uplink radio communication (radio communication from the terminal apparatus to the base station apparatus). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK).

The PDSCH may be used to transmit downlink data (Downlink Shared CHannel (DL-SCH)) from the MAC layer. Furthermore, in a case of the downlink, the PDSCH is also used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. The PUSCH may be used to transmit CSI only or a HARQ-ACK and CSI only. In other words, the PUSCH may be used to transmit the UCI only. The PDSCH or the PUSCH may be used for transmitting RRC signaling (also referred to as an RRC message) and a MAC control element (MAC CE). In this regard, in the PDSCH, the RRC signaling transmitted from the base station apparatus may be signaling common to multiple terminal apparatuses in a cell. The RRC signaling transmitted from the base station apparatus may be dedicated signaling for a certain terminal apparatus (also referred to as dedicated signaling). In other words, terminal apparatus-specific (UE-specific) information may be transmitted through dedicated signaling to the certain terminal apparatus. Additionally, the PUSCH may be used to transmit UE capabilities in the uplink.

The PRACH may be used for transmitting a random access preamble. The PRACH may be used for indicating the initial connection establishment procedure, the handover procedure, the connection re-establishment procedure, synchronization (timing adjustment) for uplink transmission, and a request for a PUSCH (UL-SCH) resource.

The MAC 302 is a medium access control layer that maps various logical channels to various transport channels. The MAC 302 may be connected with an upper Radio Link Control layer (RLC) 304 to be described later via the logical channels. The classification of the logical channel depends on the type of information to be transmitted, and the logical channels may be classified into the control channels for transmitting the control information and the traffic channels for transmitting the user information. The MAC 302 may have a function of controlling the PHY 300 in order to perform the Discontinuous Reception and Transmission (DRX and DTX), a function of performing the Random Access procedure, a function of reporting transmit power information, a function of performing HARQ control, and the like. The MAC 302 may have a function of controlling an activated state of a cell configured in an RRC layer (NPL 7).

The RLC 304 is a radio link control layer that segments data received from a Packet Data Convergence Protocol Layer (PDCP) 306 corresponding to an upper layer to be described below, and adjusts the data size such that a lower layer can properly transmit the data.

The PDCP 306 is a packet data convergence protocol layer for efficiently transmitting IP packets, used as user data, in wireless sections. The PDCP 306 may include a header compression function to compress control information. Additionally, the PDCP 306 may also include a data ciphering function and a data integrity protection function.

A Service Data Adaptation Protocol (SDAP) 310 is a service data adaptation protocol layer that functions to map the DRB to a downlink QoS flow transmitted from the 5GC 110 to the terminal apparatus via the base station apparatus, and to map the DRB to an uplink QoS flow transmitted from the terminal apparatus to the 5GC 110 via the base station apparatus, and to store mapping rule information.

Note that the data processed in the MAC 302, the RLC 304, the PDCP 306, and the SDAP 310 are referred to as a MAC Protocol Data Unit (PDU), an RLC PDU, a PDCP PDU, and an SDAP PDU, respectively. Data delivered from an upper layer to the MAC 302, the RLC 304, the PDCP 306, and the SDAP 310 or data delivered therefrom to an upper layer are respectively referred to as a MAC Service Data Unit (SDU), an RLC SDU, a PDCP SDU, and an SDAP SDU. A segmented RLC SDU is referred to as an RLC SDU segment.

FIG. 3(B) is a protocol stack diagram of the CP used by the UE 122 in communicating with the gNB 108 and an Access and Mobility Management function (AMF) used as a logical node providing functions such as authentication and mobility management in the NR 106.

In the protocol stack of the CP, a Radio Resource Control layer (RRC) 308 and a non Access Strarum (NAS) 312 are present in addition to the PHY 300, the MAC 302, the RLC 304, and the PDCP 306. The RRC 308 is a radio link control layer that performs processing such as establishment, re-establishment, suspension, resumption, and the like of an RRC connection, reconfiguration of the RRC connection, for example, configuration of the radio bearer (RB) and the cell group such as establishment, change, or release, control of logical channels, transport channels, and physical channels, and the like, and further performs configuration of handover and measurement, and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between RRCs 308 of the gNB 108 and the UE 122. A portion of the RB including the RLC 304 and the logical channel may be referred to as an RLC bearer.

In contrast to the NAS layer carrying signals between the AMF and the UE 122, some or all of the layers of the PHY 300, the MAC 302, the RLC 304, the PDCP 306, the RRC 308, and the SDAP 310 carrying signals and data between the UE 122 and the gNB 108 may be referred to as Access Strarum (AS) layers.

The functional classification of the MAC 302, the RLC 304, the PDCP 306, the SDAP 310, and the RRC 308 described above is an example, and some or all of the functions may not be implemented. Some or all of the functions of each layer may be included in another layer.

Note that an upper layer (not illustrated) of the AS layer may be referred to as a PDU layer, as described in NPL 2. The PDU layer may include any or all of an IP layer, a Transmission Control Protocol (TCP) layer and a User Datagram Protocol (UDP) layer that are upper layers than the IP layer, or other layers. The application layer may be an upper layer than the PDU layer or may be included in the PDU layer. Note that the PDU layer may be an upper layer with respect to the user plane of the AS layer. Additionally, the RRC layer and the non Access Strarum (NAS) layer may also be an upper layer than one or all of the SDAP layer and the PDCP layer (not illustrated). In other words, one or all of the SDAP layer and the PDCP layer are lower layers than any or all of the RRC layer, the NAS layer, the IP layer, and the Transmission Control Protocol (TCP) layer, the User Datagram Protocol (UDP) layer, and the application layer that are upper layers than the IP layer.

Note that the RRC layer of the terminal apparatus may perform any or all of establishment, configuration, and control on the physical layer, the MAC layer, the RLC layer, the PDCP layer, and the SDAP layer of the terminal apparatus. The RRC layer of the terminal apparatus may establish and/or configure the physical layer, the MAC layer, the RLC layer, the PDCP layer, and the SDAP layer in accordance with the RRC message transmitted from the RRC layer of the base station apparatus. The MAC layer, the RLC layer, the PDCP layer, and the SDAP layer may respectively be referred to as a MAC sublayer, an RLC sublayer, a PDCP sublayer, and a SDAP sublayer.

Note that an entity may refer to each of the layers belonging to the AS layer configured for one or all of the terminal apparatus and the base station apparatus or the function of each layer. Specifically, the physical layer (PHY layer), the MAC layer, the RLC layer, the PDCP layer, the SDAP layer, and the RRC layer, on which any or all of establishment, configuration, and control is performed for one or all of the terminal apparatus and the base station apparatus, or the functions of the respective layers may be referred to as a physical entity (PHY entity), a MAC entity, an RLC entity, a PDCP entity, an SDAP entity, and an RRC entity. One or multiple entities may be included in each layer. Any or all of establishment, configuration, and control may be performed on the PDCP entity and the RLC entity for each radio bearer. Any or all of establishment, configuration, and control may be performed on the MAC entity for each cell group. Any or all of establishment, configuration, and control may be performed on the SDAP entity for each PDU session.

Note that in each embodiment of the present invention, for a distinction between the E-UTRA protocol and the NR protocol, the MAC 202, the RLC 204, the PDCP 206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. Furthermore, the MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2. In the E-UTRA 100, the NR PDCP may be used as a PDCP even in a case that the UE 122 communicates with the eNB 102.

The state transition of the UE 122 in LTE and NR will now be described. The UE 122 connected to the EPC or the 5GC may be in an RRC_CONNECTED state in a case that an RRC connection has been established. The state in which the RRC connection has been established may include a state in which the UE 122 retains a part or all of UE contexts to be described later. The state in which the RRC connection has been established may include a state in which the UE 122 can transmit and/or receive unicast data. The UE 122 may be in an RRC_INACTIVE state in a case that the RRC connection is suspended (in a case that the UE 122 is connected to the 5GC). In the other cases, the UE 122 may be in an RRC_IDLE state.

Note that the UE 122 connected to the EPC does not have the RRC_INACTIVE state but that the E-UTRAN may initiate suspension of the RRC connection. In this case, in response to suspension of the RRC connection, the UE 122 transitions to the RRC_IDLE state while retaining an AS context of the UE and an identity used for resumption (resumeIdentity). In a case that the UE 122 retains the AS context of the UE and that the E-UTRAN permits the RRC connection to be resumed and that the UE 122 needs to transition from the RRC_IDLE state to the RRC_CONNECTED state, the resumption of the RRC connection suspended may be initiated by the upper layer (e.g., the NAS layer).

In other words, the definition of the suspension may vary between the UE 122 connected to the EPC and the UE 122 connected to the 5GC. All or a part of the procedures for the UE 122 to resume from suspension may be different between a case that the UE 122 is connected to the EPC (is suspended in the RRC_IDLE state) and a case that the UE 122 is connected to the 5GC (is suspended in the RRC_INACTIVE state).

Note that the RRC_CONNECTED state, the RRC_INACTIVE state, and the RRC_IDLE state may be respectively referred to as a connected state (connected mode), an inactive state (inactive mode), and an idle state (idle mode), or may be respectively referred to as an RRC connected state (RRC connected mode), an RRC inactive state (RRC inactive mode), and an RRC idle state (RRC idle mode).

The AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source, a cell identity (cellIdentity), and a physical cell identity of the PCell of the connection source. Note that the AS context of the UE retained by one or all of the eNB 102 and the gNB 108 may include information identical to the information of the AS context of the UE retained by the UE 122, or may include information different from the information included in the AS context of the UE retained by the UE 122.

Figure 4:
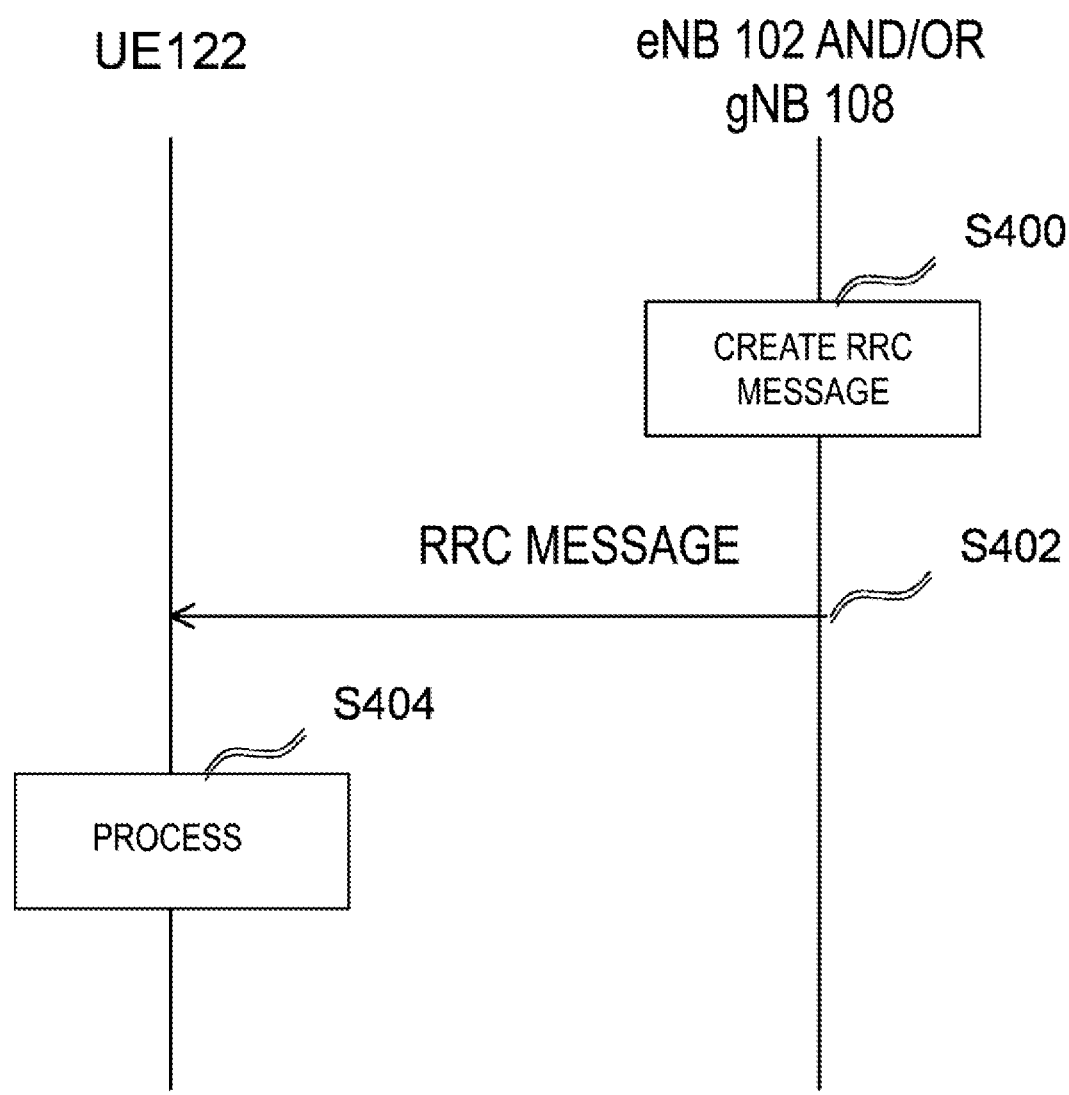
FIG. 4 is a diagram illustrating an example of a flow of a procedure for various configurations in an RRC 208 and/or an RRC 308 according to each embodiment of the present invention.

FIG. 4 is a diagram illustrating an example of a flow of a procedure for various configurations in the RRC 208 and/or the RRC 308 according to each embodiment of the present invention. FIG. 4 is an example of a flow in a case that an RRC message is transmitted from the base station apparatus (eNB 102 and/or gNB 108) to the terminal apparatus (UE 122).

In FIG. 4, the base station apparatus creates an RRC message (step S400). The creation of the RRC message in the base station apparatus may be performed in a case that the base station apparatus distributes broadcast information (System Information (SI)) or paging information, or in a case that the base station apparatus determines a need to cause a particular terminal apparatus to perform processing, for example, configuration related to security, reconfiguration of an RRC connection (processing (establishment, change, release, or the like) of the radio line bearer, processing (establishment, addition, change, release, or the like) of the cell group, measurement configuration, handover configuration, or the like), release of the RRC connected state, or the like. The RRC message includes information (parameters) for various information notifications and configurations. In specifications (NPL 8, NPL 9) related to RRC, the above-described parameters are referred to as fields and/or information elements, and are notated by using a notation method referred to as Abstract Syntax Notation One (ASN.1).

The RRC message may be created for other purposes. For example, the RRC message may be used for configuration related to Dual Connectivity (DC) or Multi-Radio Dual Connectivity (MR-DC).

In FIG. 4, the base station apparatus then transmits the RRC message created, to the terminal apparatus (step S402). Then, in a case that processing such as a configuration is necessary in accordance with the RRC message received, the terminal apparatus performs the processing (step S404).

The Dual Connectivity (DC) may be a technology for performing data communication by using radio resources of both cell groups including a master cell group (MCG) including master nodes (MNs) and a secondary cell group (SCG) including secondary nodes (SNs), each cell group including two base station apparatuses (nodes). The master node and the secondary node may be an identical node (identical base station apparatus). Furthermore, the MR-DC may be a technology in which cells of both Radio Access Technologies (RATs) of E-UTRA and NR are formed into cell groups for each RAT, which are assigned to the UE, and in which data communication is performed by utilizing radio resources of both MCG and SCG. In the MR-DC, the master node may be a base station including primary RRC functions related to MR-DC, for example, functions to add a secondary node, to establish, change, and release an RB, to add, change, and release an MCG, and to perform handover and the like, and the secondary base station may be a base station including some RRC functions, for example, functions to change and release an SCG, and the like.

In the MR-DC, the RRC corresponding to the master node side RAT may be used to configure both the MCG and the SCG. For example, in E-UTRA-NR Dual Connectivity (EN-DC) corresponding to the MR-DC in which the EPC 104 is used as a core network and the eNB 102 (also referred to as an evolved eNB 102) is used as a master node and in NG-RAN E-UTRA-NR Dual Connectivity (NGEN-DC) corresponding to the MR-DC in which the 5GC 110 is used as a core network and the eNB 102 is used as a master node, an RRC message for E-UTRA may be transmitted and received between the eNB 102 and the UE 122. In this case, the RRC message may include NR configuration information as well as LTE (E-UTRA) configuration information. Additionally, the RRC message transmitted from the eNB 102 to the UE 122 may be transmitted from the eNB 102 to the UE 122 via the gNB 108. The configuration of the present RRC message may be used in E-UTRA/5GC corresponding to non-MR-DC in which the eNB 102 (evolved eNB) uses the 5GC as a core network.

In contrast, in the MR-DC, in NR-E-UTRA Dual Connectivity (NE-DC) corresponding to the MR-DC in which the 5GC 110 is used as a core network and the gNB 108 is used as a master node, an RRC message for NR may be transmitted and/or received between the gNB 108 and the UE 122. The RRC message in this case may include LTE (E-UTRA) configuration information as well as NR configuration information. Additionally, the RRC message transmitted from the gNB 108 to the UE 122 may be transmitted from the gNB 108 to the UE 122 via the eNB 102.

Note that the embodiment is not limited to the case of utilization of the MR-DC and that the RRC message for E-UTRA transmitted from the eNB 102 to the UE 122 may include an RRC message for NR, whereas or the RRC message for NR transmitted from the gNB 108 to the UE 122 may include an RRC message for E-UTRA.

FIG. 7 illustrates an example of an ASN. 1 notation representing a part or all of fields and information elements related to a cell group configuration included in a message related to RRC connection reconfiguration in NR in FIG. 4. FIG. 8 illustrates an example of an ASN. 1 notation representing a part or all of fields and information elements related to a cell group configuration included in a message related to RRC connection reconfiguration in E-UTRA in FIG. 4. Not only in FIG. 7 and FIG. 8, in examples of the ASN. 1 according to an embodiment of the present invention, <omitted> and <partly omitted> are not a part of the notation of the ASN. 1 and indicate that other information is omitted at these positions. Note that there may also be omitted information elements in a part where neither <omitted> nor <partly omitted> is indicated. Note that, in the embodiment of the present invention, the examples of ASN. 1 do not correctly follow the ASN. 1 notation method but represent examples parameters of a message for reconfiguration of RRC connection according to an embodiment of the present invention and that any other designation and any other notation may be used. The examples of ASN. 1 correspond to only examples related to main information closely associated with an aspect of the present invention in order to avoid complicated description. Note that the parameters notated in ASN. 1 may all be referred to as information elements without distinction between fields, information elements, or the like. In an embodiment of the present invention, the parameters such as fields and information elements notated in ASN.1, the parameters being included in the RRC message, may also be referred to as information. Note that the message related to reconfiguration of RRC connection may be an RRC reconfiguration message in NR or an RRC connection reconfiguration message in E-UTRA.

In FIG. 7, radioBearerConfig included in an RRCReconfiguration message may include a configuration of a radio bearer. masterCellGroup may include a configuration related to the MCG in a case that the MCG is of NR. secondaryCellGroup may include a configuration related to the SCG in a case of report from a cell of the SCG to the terminal apparatus. mrdc-SecondaryCellGroupConfig may include a configuration related to the SCG in a case of report from a cell of the MCG to the terminal apparatus.

masterCellGroup, secondaryCellGroup, and/or, mrdc-SecondaryCellGroupConfig described above may include a CellGroupConfig information element as a value.

The CellGroupConfig information element may include a configuration related to the cell group. cellGroupId included in the CellGroupConfig information element may include information of an identifier for identifying the cell group. mac-CellGroupConfig may include a configuration related to the MAC layer of the cell group. spCellConfig may include a configuration related to the SpCell. sCellToAddModList may include a configuration related to addition or change of the SCell belonging to the cell group. sCellToReleaseList may include information related to deletion of the SCell belonging to the cell group.

In FIG. 8, sCellToReleaseList-r10 included in an RRC-ConnectionReconfiguration message may include information related to deletion of the SCell belonging to the MCG. sCellToAddModList-r10 may include a configuration related to addition or change of the SCell belonging to the MCG. scg-Configuration-r12 may include a configuration related to the SCG. scg-ConfigPartSCG-r12 included in scg-Configuration-r12 may include a configuration related to the SpCell of the SCG (pSCellToAddMod-r12 or the like), a configuration related to addition or change of the SCell belonging to the cell group (sCellToAddModList-SCG-r12 or the like), and/or information related to deletion of the SCell belonging to the cell group (sCellToReleaseListSCG-r12 or the like). A configuration related to addition or change of the SCell in a case of handover and/or a configuration related to addition or change of the SCell in a case that the SCell is added may include information indicating the initial state of the SCell. For example, information indicating one of an activated state (Activated) and a dormant state (Dormant) may be included in an RRC message. In a case that the information is included, the initial state of the SCell may be configured to the activated state (Activated) or the dormant state (Dormant), based on the information. In a case that the information is not included, the initial state of the SCell may be configured to a deactivated state (Deactivated).

Note that usage of each of the fields and the information elements described above is not limited to the usage described above.

The terminal apparatus that has received the RRC message including the above information from the base station apparatus performs configuration of the SpCell (PCell) of the MCG, the SCell of the MCG, the SpCell (PSCell) of the SCG, and/or the SCell of the SCG, based on the information.

The terminal apparatus may monitor the radio link by using a certain type of reference signal (e.g., cell-specific reference signal (CRS)) in the serving cell (e.g., the PCell and/or PSCell). The terminal apparatus may receive, from the base station apparatus, a configuration indicating which reference signal is used for radio link monitoring in the serving cell (e.g., the PCell and/or PSCell) (radio link monitoring configuration: RadioLinkMonitoringConfig), and monitor the radio link by using one or multiple reference signals (referred to here as RLM-RSs). The terminal apparatus may monitor the radio link by using any other signal. The physical layer processing unit of the terminal apparatus may notify the upper layer of in-sync in a case that conditions for in-sync are satisfied in the serving cell (e.g., the PCell and/or the PSCell).

The radio link monitoring configuration may include information indicating the purpose of monitoring and identifier information indicating the reference signal. For example, the purpose of monitoring may include the purpose of monitoring radio link failure, the purpose of monitoring beam failure, both of the purposes, and the like. For example, the identifier information indicating the reference signal may include information indicating the identifier (SSB-Index) of a synchronization signal block (SSB) of the cell. That is, the reference signal may include the synchronization signal. For example, the identifier information indicating the reference signal may include information indicating an identifier linked to a channel state information reference signal (CSI-RS) configured for the terminal apparatus.

In the SpCell (the PCell in the MCG and the PSCell in the SCG), in response to a predefined number of (N310) continuous receptions of out-of-sync notified from the physical layer processing unit in each SpCell, the RRC layer processing unit of the terminal apparatus may start or restart the timer (T310) of the SpCell. In response to a predefined number of (N311) continuous receptions of in-sync in each SpCell, the RRC layer processing unit of the terminal apparatus may stop the timer (T310) for the SpCell. The RRC layer processing unit of the terminal apparatus may perform transition to the idle state or the RRC connection re-establishment procedure in a case that the SpCell is a PCell in a case that the timer (T310) for each SpCell expires. In a case that the SpCell is the PSCell, the SCG failure information procedure may be performed to notify the network of the SCG failure.

The above description is an example of a case in which discontinuous reception (DRX) is not configured for the terminal apparatus. With the DRX configured for the terminal apparatus, the RRC layer processing unit of the terminal apparatus may configure for the physical layer processing unit the period of time for measuring radio link quality and the intervals of notifications to the upper layer such that the period of time and the intervals have values different from those in the case that the DRX is not configured. Note that, even with the DRX configured, in a case that the above-described timer is running, the period of time when radio link quality is measured for estimation of in-sync and the intervals of notifications to the upper layer may have values identical to those used in a case that the DRX is not configured.

The RLM-RS described above may be undefined in a case that the RLM-RS is not explicitly or implicitly configured by the network. In other words, the terminal apparatus need not monitor the radio link in a case that no RLM-RS is configured by the network (for example, the base station apparatus).

Moreover, radio link monitoring using the CRS may be performed in an EUTRA cell, and radio link monitoring using the RLM-RS may be performed in an NR cell, but no such limitation is intended.

Activation and deactivation of a cell will be described. The terminal apparatus communicating in dual connectivity is configured with the master cell group (MCG) and configured with the secondary cell group (SCG) by the message related to reconfiguration of RRC connection. Each cell group may include a special cell (SpCell) and zero or more cells (secondary cells (SCells)) other than the special cell. The SpCell of the MCG is also referred to as a PCell. The SpCell of the SCG is also referred to as a PSCell. Deactivation of a cell may not be applied to the SpCell but may be applied to the SCell.

Deactivation of a cell may not be applied to the PCell but may be applied to the PSCell. In this case, deactivation of a cell may be processing different between the SpCell and the SCell.

As described in NPL 6 and NPL 7, activation and deactivation of a cell may be processed in the MAC entity that is present for each cell group. The SCell configured for the terminal apparatus may be activated and/or deactivated by the following (A) and/or (B):
  (A) reception of a MAC CE indicating activation/deactivation of the SCell;
  (B) a timer (sCellDeactivation Timer) configured for each SCell not configured with the PUCCH.

Specifically, in the terminal apparatus, the MAC entity may perform the following processing (AD) for each SCell configured in the cell group.
Processing AD
  In a case that the MAC CE for activating the SCell is received, processing (AD-1) is performed. Otherwise, that is, in a case that the MAC CE for deactivating the SCell is received, or the timer (sCellDeactivation Timer) expires in the SCell in the activated state, processing (AD-2) is performed. In a case that an uplink grant or a downlink assignment is reported on the PDCCH of the SCell in the activated state, or an uplink grant or a downlink assignment for the SCell in the activated state is reported on the PDCCH of a certain serving cell, or the MAC PDU is transmitted in a configured uplink grant, or the MAC PDU is received in a configured downlink assignment, the timer (sCellDeactivation Timer) associated with the SCell is restarted. In a case that the SCell enters the deactivated state, processing (AD-3) is performed.
Processing AD-1
  The SCell is caused to be in the activated state, and normal SCell operation including a part or all of the following (A) to (E) is applied (performed):
    (A) transmit a sounding reference signal (SRS) in the SCell;
    (B) report channel state information (CSI) for the SCell;
    (C) monitor the PDCCH in the SCell;
    (D) monitor the PDCCH for the SCell (in a case that scheduling for the SCell is performed in another serving cell);
    (E) perform PUCCH transmission in the SCell in a case that the PUCCH is configured.

In a case that, in NR, the SCell is in the deactivated state before the MAC CE for activation is received, a part or all of the following (A) to (B) is performed:
  (A) activate a BWP indicated by an identifier (firstActiveDownlinkBWP-Id) of a downlink BWP configured in an RRC message;
  (B) activate a BWP indicated by an identifier (firstActiveUplinkBWP-Id) of an uplink BWP configured in an RRC message.

The timer (sCellDeactivation Timer) associated with the SCell is started, or is restarted (in a case that the timer has already been started).
Processing AD-2
  The SCell is deactivated.
  The timer (sCellDeactivation Timer) associated with the SCell is stopped.
  All of activated BWPs associated with the SCell are deactivated.
  A HARQ buffer associated with the SCell is flushed.
Processing AD-3
  A part or all of the following (A) to (D) is performed:
    (A) not transmit an SRS in the SCell;
    (B) not report CSI for the SCell;
    (C) not transmit the PUCCH, the UL-SCH, and/or the RACH in the SCell;
    (D) not monitor the PDCCH for the SCell and/or the PDCCH for the SCell.

As described above, activation and deactivation of the SCell is performed by the MAC entity performing the processing (AD).

In a case that the SCell is added as described above, the initial state of the SCell may be configured by the RRC message.

Here, the timer (sCellDeactivationTimer) will be described. A value (information related to time at which the timer is considered to have expired) of the timer (sCellDeactivation Timer) may be reported, by the RRC message, to the SCell not configured with the PUCCH. For example, in a case that information indicating 40 ms as the value of the timer (sCellDeactivationTimer) is reported by the RRC message, in the processing (AD), the timer is considered to have expired after the elapse of time (here, 40 ms) reported without stopping of the timer since the timer is started or restarted.

Here, a bandwidth part (BWP) will be described.

The BWP may be a partial band or an entire band of the serving cell. The BWP may be referred to as a Carrier BWP.

The terminal apparatus may be configured with one or multiple BWPs. A certain BWP may be configured by information included in broadcast information associated with a synchronization signal detected in initial cell search. A certain BWP may be a frequency bandwidth associated with a frequency for performing the initial cell search. A certain BWP may be configured by RRC signaling (for example, Dedicated RRC signaling). A downlink BWP (DL BWP) and an uplink BWP (UL BWP) may be separately configured. One or multiple uplink BWPs may be associated with one or multiple downlink BWPs. Association between the uplink BWP and the downlink BWP may be prescribed association, may be association by RRC signaling (for example, Dedicated RRC signaling), may be association by physical layer signaling (for example, downlink control information (DCI) reported on a downlink control channel, or may be a combination of those.

The BWP may include a group of continuous Physical Resource Blocks (PRBs). For the terminal apparatus in the connected state, parameters of the BWP(s) (one or multiple BWPs) of each component carrier may be configured. The parameters of the BWP of each component carrier may include a part or all of: (A) a type of a cyclic prefix; (B) a subcarrier spacing; (C) a frequency position of the BWP (for example, a start position on a low frequency side of the BWP or a center frequency position) (as the frequency position, for example, ARFCN may be used, or an offset from a specific subcarrier of the serving cell may be used. A unit of the offset may be a subcarrier unit, or may be a resource block unit. Both of the ARFCN and the offset may be configured); (D) a bandwidth of the BWP (for example, the number of PRBs); (E) resource configuration information of a control signal; and (F) center frequency position of an SS block (as the frequency position, for example, ARFCN may be used, or an offset from a specific subcarrier of the serving cell may be used. A unit of the offset may be a subcarrier unit, or may be a resource block unit. Both of the ARFCN and the offset may be configured). The resource configuration information of a control signal may be at least included in configuration of a part or all of the BWPs of the PCell and/or the PSCell.

The terminal apparatus may perform transmission and/or reception in an active BWP (Active BWP) out of the one or multiple configured BWPs. A maximum of one uplink BWP and/or a maximum of one downlink BWP may be configured to be an active BWP at certain time out of the one or multiple BWPs configured for one serving cell for the terminal apparatus. The activated downlink BWP is also referred to as an Acitve DL BWP. The activated uplink BWP is also referred to as an Active UL BWP.

Next, deactivation of the BWP will be described. One serving cell may be configured with one or multiple BWPs. BWP switching in the serving cell is used to activate a deactivated BWP (also referred to as an Inactive BWP) and deactivate an activated BWP.

The BWP switching is controlled by the MAC entity itself for the PDCCH indicating a downlink assignment or an uplink grant, a timer (bwp-InactivityTimer), RRC signaling, or initiation of a random access procedure. The Active BWP of the serving cell is indicated by the RRC or the PDCCH.

Next, a Dormant BWP will be described. Entering to the dormant BWP or leaving from the dormant BWP is performed through the BWP switching. This control is performed by the PDCCH for each SCell, or for each group referred to as a dormancy SCell group (Dormancy SCell Group). Configuration of the dormancy SCell group is indicated by the RRC signaling. In the current specifications, the dormant BWP is applied to only the SCell. Note that, it may be understood that the dormant BWP is not for changing a certain BWP into the dormant state but is one BWP configured for dormancy out of one or multiple BWPs configured for the UE. There may be multiple BWPs that are configured for the UE for dormancy.

A certain BWP being the dormant BWP may be indicated by no inclusion of a specific parameter in the configuration of the BWP. For example, no inclusion of a PDCCH-Config information element, being an information element for configuring parameters of the PDCCH specific to the UE included in the configuration of the downlink BWP, may indicate that the BWP is the dormant BWP. For example, no configuration (no inclusion) of a part of parameters included in the PDCCH-Config information element, being an information element for configuring parameters of the PDCCH specific to the UE included in the configuration of the downlink BWP, may indicate that the BWP is the dormant BWP. For example, no configuration (no inclusion) of a part or all of configurations related to a search space for defining where and/or how candidates for the PDCCH are searched, which are configured by the PDCCH-Config information element, as the configuration of a certain BWP may indicate that the BWP is the dormant BWP.

The current specifications do not support configuration of the dormant BWP for a PUCCH SCell that allows transmission of the SpCell such as the PCell and the PSCell and the PUCCH.

The UE that has received in the SpCell the PDCCH indicating leaving from the dormant BWP outside a certain configured period (active time) activates the downlink BWP indicated by a first downlink BWP identifier reported by the RRC signaling in advance.

The UE that has received in the SpCell the PDCCH indicating leaving from the dormant BWP within the certain configured period (active time) activates the downlink BWP indicated by a second downlink BWP identifier reported by the RRC signaling in advance.

The UE that has received the PDCCH indicating entering to the dormant BWP activates the downlink BWP indicated by a third downlink BWP identifier (dormantDownlinkBWP-Id) reported by the RRC signaling in advance.

The entering to and the leaving from the dormant BWP are performed through the BWP switching, and in a case that a new BWP is activated, the BWP that has thus far been in the activated state is deactivated. In other words, in a case of leaving from the dormant BWP, the dormant BWP is deactivated, and in a case of entering to the dormant BWP, the dormant BWP is activated.

Here, the PDCCH indicating entering to the dormant BWP and the PDCCH indicating leaving from the dormant BWP will be described.

For example, the UE configured with discontinuous reception (DRX) in the SpCell may monitor the PDCCH in the Active BWP of the SpCell in order to detect a certain DCI format (for example, DCI format 2_6) outside the active time of DRX. A CRC of the DCI format may be scrambled with a certain RNTI (for example, a PS-RNTI). The UE configured with the dormancy SCell group determines switching of the Active DL BWP, based on bitmap information included in a payload of DCI format 2_6. For example, in a case that a certain bit of the bitmap is associated with one dormancy SCell group and the bit is 1, BWP switching may be performed to switch to another BWP configured in advance in a case that the Active DL BWP is the dormant BWP, and the BWP may remain the same in a case that the Active DL BWP is not the dormant BWP. In a case that the bit is 0, BWP switching may be performed such that the Active DL BWP is the dormant BWP.

In the active time of DRX, the UE need not monitor the PDCCH for the purpose of detecting DCI format 2_6.

The UE configured with discontinuous reception (DRX) in the SpCell may monitor the PDCCH in the Active BWP of the SpCell in order to detect certain DCI formats (for example, DCI formats 0_1 and 1_1) in the active time of DRX. A CRC of the DCI formats may be scrambled with a certain RNTI (for example, a C-RNTI or an MCS-C-RNTI). The UE configured with the dormancy SCell group determines switching of the Active DL BWP, based on bitmap information included in a payload of DCI format 0_1 or DCI format 1_1. For example, in a case that a certain bit of the bitmap is associated with one dormancy SCell group and the bit is 1, BWP switching may be performed to switch to another BWP configured in advance in a case that the Active DL BWP is the dormant BWP, and the BWP may remain the same in a case that the Active DL BWP is not the dormant BWP. In a case that the bit is 0, BWP switching may be performed such that the Active DL BWP is the dormant BWP. The "another BWP configured in advance" may be a BWP different from the "another BWP configured in advance" used in the description for DCI format 2_6.

Outside the active time of DRX, the UE need not monitor the PDCCH for the purpose of detecting DCI format 0_1 and DCI format 1_1.

To monitor the PDCCH indicating leaving from the dormant BWP may be to monitor the PDCCH for the purpose of detecting DCI format 2_6 outside the active time of DRX, and to monitor the PDCCH for the purpose of detecting DCI format 0_1 and DCI format 1_1 in the active time of DRX.

In each activated serving cell in which the BWP is configured, in a case that the BWP is activated (Active BWP), and the BWP is not the dormant BWP, the MAC entity performs a part or all of the following (A) to (H):
  (A) transmit the UL-SCH in the BWP;
  (B) transmit the RACH in the BWP in a case that a PRACH occasion is configured;
  (C) monitor the PDCCH in the BWP;
  (D) transmit the PUCCH in the BWP in a case that the PUCCH is configured;
  (E) report the CSI in the BWP;
  (F) transmit the SRS in the BWP in a case that the SRS is configured;
  (G) receive the DL-SCH in the BWP;
  (H) initialize a configured uplink grant of grant type 1 configured and suspended in the BWP.

In each activated serving cell in which the BWP is configured, in a case that the BWP is activated (Active BWP), and the BWP is the dormant BWP, the MAC entity performs a part or all of the following (A) to (G):
  (A) stop the timer (bwp-InactivityTimer) of the serving cell of the BWP, in a case that the timer is running;
  (B) not monitor the PDCCH of the BWP;
  (C) not monitor the PDCCH for the BWP;
  (D) not receive the DL-SCH in the BWP;
  (E) perform CSI measurement in the BWP in a case that CSI measurement is configured;
  (F) stop all of uplink behaviors. In other words, stop uplink transmission, suspend the configured uplink grant of grant type 1 associated with the cell, and clear the configured uplink grant of grant type 2 associated with the cell;
  (G) detect a beam failure in a case that configuration related to a beam failure is configured, and perform a beam failure recovery in a case that a beam failure is detected.

In a case that the BWP is deactivated, the MAC entity performs a part or all of the following (A) to (I):
  (A) not transmit the UL-SCH in the BWP;
  (B) not transmit the RACH in the BWP;
  (C) not monitor the PDCCH in the BWP;
  (D) not transmit the PUCCH in the BWP;
  (E) not report the CSI in the BWP;
  (F) not transmit the SRS in the BWP;
  (G) not receive the DL-SCH in the BWP;
  (H) clear the configured uplink grant of grant type 2 configured in the BWP;
  (I) suspend the configured uplink grant of grant type 1 of the deactivated BWP (inactive BWP).

Next, the random access procedure in the UE configured with the BWP will be described. In a case of initiating the random access procedure in a certain serving cell, in a selected carrier of the serving cell, the MAC entity performs a part or all of the processing of the following (A) to (E):
  (A) in a case that a resource (occasion) for transmitting the PRACH is not configured for the Active UL BWP, (A1) switch the Active UL BWP to the BWP indicated by an RRC parameter (initialUplinkBWP), and (A2) in a case that the serving cell is the SpCell, switch the Active UL BWP to the BWP indicated by an RRC parameter (initialDownlinkBWP);
  (B) in a case that a resource (occasion) for transmitting the PRACH is configured for the Active UL BWP, the serving cell is the SpCell, and the Active DL BWP and the Active UL BWP do not include the same identifier (bwp-Id), switch the Active DL BWP to the BWP of an identifier the same as the identifier of the Active UL BWP;
  (C) in a case that the timer (bwp-InactivityTimer) associated with the Active DL BWP of the serving cell is running, stop the timer;
  (D) in a case that the serving cell is the SCell, and the timer (bwp-InactivityTimer) associated with the Active DL BWP of the SpCell is running, stop the timer;
  (E) perform the random access procedure in the Active DL BWP of the SpCell and the Active UL BWP of the serving cell.

Next, the timer (bwp-InactivityTimer) will be described. For each activated serving cell (Activated Serving Cell) configured with the timer (bwp-Inactivity Timer), the MAC entity performs the processing of the following (A):
  (A) in a case that an identifier (defaultDownlinkBWP-Id) of a default downlink BWP is configured, and the Active DL BWP is not the BWP indicated by an identifier (dormantDownlinkBWP-Id), or in a case that the identifier (defaultDownlinkBWP-Id) of the default downlink BWP is not configured, the Active DL BWP is not initialDownlinkBWP, and the Active DL BWP is not the BWP indicated by the identifier (dormantDownlinkBWP-Id), perform the processing of the following (B) and (D):
  (B) in a case that the PDCCH addressed to a C-RNTI or a CS-RNTI indicating a downlink assignment or an uplink grant is received in the Active DL BWP, the PDCCH addressed to a C-RNTI or a CS-RNTI indicating a downlink assignment or an uplink grant for the Active DL BWP is received, the MAC PDU is transmitted in a configured uplink grant, or the MAC PDU is received in a configured downlink assignment, perform the processing of the following (C):

(C) in a case that the random access procedure associated with the serving cell is not being performed, or the random access procedure being performed associated with the serving cell successfully completed in response to reception of the PDCCH addressed to the C-RNTI, start or restart bwp-InactivityTimer associated with the Active DL BWP;

(D) in a case that bwp-InactivityTimer associated with the Active DL BWP expires, the processing of the following (E) is performed:

(E) in a case that defaultDownlinkBWP-Id is configured, perform BWP switching for the BWP indicated by defaultDownlinkBWP-Id, otherwise, perform BWP switching for initialDownlinkBWP.

In a case that the MAC entity receives the PDCCH for BWP switching and finishes switching the Active DL BWP, the MAC entity performs the processing of the following (A):

(A) in a case that the identifier (defaultDownlinkBWP-Id) of the default downlink BWP is configured, the switched Active DL BWP is not the BWP indicated by the identifier (dormantDownlinkBWP-Id), and the switched Active DL BWP is not the BWP indicated by dormantDownlinkBWP-Id, start or restart bwp-InactivityTimer associated with the Active DL BWP.

Next, a procedure for detection and recovery of a beam failure will be described.

In the MAC entity, a beam failure recovery procedure may be configured for each serving cell by the RRC. The beam failure is detected by counting a beam failure instance report reported from a lower layer (PHY layer) to the MAC entity. The MAC entity may perform a part or all of the processing of the following (A), (B), and (C) in each serving cell for beam failure detection:

(A) in a case that the beam failure instance report is received from a lower layer, start or restart the timer (beamFailureDetection Timer) and increment a counter (BFI-COUNTER) by 1. In a case that a value of BFI_COUNTER is equal to or larger than a configured threshold (beamFailureInstanceMaxCount), perform the processing of the following (A-1):

(A-1) in a case that the serving cell is the SCell, trigger a beam failure recovery (BFR) for the serving cell, otherwise, initiate the random access procedure in the SpCell;

(B) in a case that beam FailureDetection Timer for the serving cell expires, or a configuration of beamFailureDetection Timer, beamFailureInstanceMaxCount, and/or a reference signal for beam failure detection is changed by an upper layer, configure BFI_COUNTER to 0;

(C) in a case that the serving cell is the SpCell, and the random access procedure successfully completed, configure BFI_COUNTER to 0, stop the timer (beamFailureRecoveryTimer), and consider that the beam failure recovery procedure successfully completed. Otherwise, that is, in a case that the serving cell is the SCell, the PDCCH addressed to the C-RNTI indicating a new uplink grant for transmitting information for the beam failure recovery of the SCell (for example, information included in an SCell BFR MAC CE) is received, or the SCell is in the deactivated state, configure BFI-_COUNTER to 0, consider that the beam failure recovery procedure successfully completed, and cancel all of the beam failure recoveries (BFRs) triggered for the serving cell.

In a case that at least one beam failure recovery (BFR) is triggered by the beam failure recovery procedure, and it is not cancelled, the MAC entity performs the processing of the following (A):

(A) in a case that the UL-SCH resource can include a BFR MAC CE of the SCell and its subheader with priority of logical channels being taken into consideration, include the BFR MAC CE of the SCell and its subheader. Otherwise, that is, in a case that the UL-SCH resource can include a truncated BFR MAC CE of the SCell and its subheader with priority of logical channels being taken into consideration, include the truncated BFR MAC CE of the SCell and its subheader. Otherwise, trigger a scheduling request for an SCell beam failure recovery.

Dormancy of the SCell is performed by activating the dormant BWP in the SCell. Even in a case that the SCell is in the dormant state, measurement of the CSI in the SCell, Automatic Gain Control (AGC), and beam control (beam management) including the beam failure recovery may be performed.

Next, dormancy (Dormant) of the SCG will be described.

In LTE and/or NR, a state in which the SCG is dormant may be included in the RRC_CONNECTED state.

In LTE and/or NR, the state in which the SCG is dormant may be a state in which the terminal apparatus performs a part or all of the following (A) to (E) in the SpCell (PSCell) of the SCG:

(A) not transmit the SRS in the SpCell;
(B) not report the CSI for the SpCell;
(C) not transmit the PUCCH, the UL-SCH, and/or the RACH in the SpCell;
(D) not monitor the PDCCH of the SpCell and/or the PDCCH for the SpCell;
(E) perform discontinuous reception (DRX) in the SpCell.

The state in which the SCG is dormant may be a state of performing a part or all of the processing of the above (A) to (E) and the following (F) to (H):

(F) change the BWP configured to be the dormant BWP in the SpCell to the activated BWP (Active BWP);
(G) monitor only the PDCCH indicating leaving from the dormant BWP in the activated dormant BWP of the SpCell;
(H) not monitor the C-RNTI on the PDCCH in the activated dormant BWP of the SpCell.

The dormancy of the SCG may be referred to as SCG suspension or SCG suspended.

The state in which the SCG is dormant (state in which the SCG has entered the dormant state) may be a state in which a first value and a second value are reported from the base station apparatus as values of a parameter (also referred to as a field) to be applied to the terminal apparatus, and the second value, out of these values, is applied to the configuration of the terminal apparatus. The second value may be applied to the configuration of the terminal apparatus, based on reception of information indicating SCG suspend from the base station apparatus.

A state in which the SCG has left the dormant state may be a state in which a first value and a second value are reported from the base station apparatus as values of a parameter (also referred to as a field) to be applied to the terminal apparatus, and the first value, out of these values, is applied to the configuration of the terminal apparatus. The first value may be applied to the configuration of the terminal apparatus, based on reception of information indicating SCG non-suspend from the base station apparatus.

In LTE and/or NR, the terminal apparatus may determine and/or perform dormancy of the SCG, based on a part or all of the following (A) to (H). Note that the messages and the control elements in the following (A) to (F) may be reported from a cell group other than the SCG to the terminal apparatus.

The dormancy of the SCG may be referred to as entering to a Dormant SCG. The dormancy of the SCG may be activation of the dormant BWP of the SpCell of the cell group. (A) to (H) are as follows:
 (A) reception of an RRC message indicating dormancy of the SCG;
 (B) reception of a MAC control element indicating dormancy of the SCG;
 (C) reception of an RRC message indicating dormancy of the SpCell;
 (D) reception of a MAC control element indicating dormancy of the SpCell;
 (E) reception of another RRC message;
 (F) reception of another MAC control element;
 (G) expiry of a timer related to dormancy of the SCG;
 (H) expiry of a timer related to dormancy of the PSCell.

In LTE and/or NR, the terminal apparatus may determine and/or perform resumption (Resume) from the dormant state of the SCG, based on a part or all of the following (A) to (H). Note that the messages and the control elements in the following (A) to (F) may be reported from a cell group other than the SCG to the terminal apparatus.

The resumption from the dormant state of the SCG may be referred to as leaving from the dormant SCG. The resumption from the dormant state of the SCG may be performing BWP switching from the dormant BWP to another BWP (not the dormant BWP) in the SpCell of the cell group. (A) to (H) are as follows:
 (A) reception of an RRC message indicating resumption from the dormant state of the SCG;
 (B) reception of a MAC control element indicating resumption from the dormant state of the SCG;
 (C) reception of an RRC message indicating resumption from the dormant state of the SpCell;
 (D) reception of a MAC control element indicating resumption from the dormant state of the SpCell;
 (E) reception of another RRC message;
 (F) reception of another MAC control element;
 (G) expiry of a timer related to dormancy of the SCG;
 (H) expiry of a timer related to dormancy of the PSCell.

The terminal apparatus that performs the dormancy of the SCG may perform a part or all of the processing of the following (A) to (F) in the SCG:
 (A) cause all of the SCells to be in the deactivated state;
 (B) consider that all of the timers (sCellDeactivationTimer) associated with the SCells in the activated state have expired;
 (C) consider that all of the timers (sCellDeactivationTimer) associated with the SCells in the dormant state have expired;
 (D) not start or restart any of the timers (sCellDeactivation Timer) associated with the SCells;
 (E) ignore the MAC CE for activating the SCells. For example, perform processing (AD-1) in a case that the MAC CE for activating the SCells is received and the dormancy of the SCG is not indicated (or in the dormant state of the SCG) in the processing (AD);
 (F) perform the processing (AD-2). For example, perform the processing (AD-2) in a case that the dormancy of the SCG is indicated (or entered the dormant state of the SCG) in the processing (AD).

The terminal apparatus that performs the dormancy of the SCG may perform a part or all of the processing of the above (A) to (F) and the following (G) to (O) in the SCG:
 (G) apply (reconfigure) a retained second configuration reported using an RRC message;
 (H) suspend transmission of a part or all of the SRBs and/or the DRBs in the SCG;
 (I) suspend a part or all of the SRBs and/or the DRBs in the SCG, and not transmit data of the logical channel associated with the suspended radio bearer(s);
 (J) change a primary path of Split SRB and/or Split DRB to the MCG;
 (K) deactivate PDCP Duplication in a case that PDCP Duplication is configured;
 (L) not reset the MAC of the SCG. Alternatively, reset the MAC of the SCG, and reconfigure the MAC by using a configuration related to the MAC included in the second configuration;
 (M) reestablish each RLC of the SCG;
 (N) perform data recovery in the PDCP of the SCG;
 (O) suspend or stop a timer used for periodic reporting such as BSR and PHR. Alternatively, release a configuration of the timer.

Here, in a case that a transmission PDCP entity is associated with multiple RLC entities, and in a case that PDCP duplication is activated and the PDCP PDU is a PDCP Data PDU, the PDU may be duplicated and submitted to the multiple RLC entities, otherwise, the PDU may be submitted to a primary RLC entity or a secondary RLC entity.

The transmission PDCP entity required to perform data recovery of the PDCP by an upper layer than the PDCP may perform, to an AM DRB, retransmission of all of the PDCP Data PDUs that have been submitted to a reestablished or released RLC entity but cannot be confirmed as being successfully delivered.

In a case that reestablishment of the RLC is required by an upper layer than the RLC, the terminal apparatus may (1) discard all of RLC SDUs, RLC SDU segments, and RLC PDUs, (2) stop and reset all of timers, and (3) reset all of state variables to their initial values.

The terminal apparatus that performs the resumption from the dormant state of the SCG may perform a part or all of the processing of the following (A) to (C) in the SCG:
 (A) perform processing (AD-1) to cause all of the SCells to be in the activated state;
 (B) cause all of the SCells to remain in the deactivated state. Note that, because it is not the dormant state, for example, in a case that the MAC CE for activating the SCells is received in the processing (AD), the dormancy of the SCG is not indicated (or in the dormant state of the SCG), and thus processing (AD-1) may be performed;
 (C) in a case that the resumption from the dormant state of the SCG is performed based on an RRC message and the RRC message includes a parameter related to random access to a part or all of the SCells, initiate the random access procedure in target SCell(s) based on the reported parameter.

The terminal apparatus that performs the resumption from the dormant state of the SCG may perform a part or all of the processing of the above (A) to (C) and the following (D) to (L) in the SCG:
 (D) apply (reconfigure) a retained first configuration reported using an RRC message;

(E) resume transmission of a part or all of the SRBs and/or the DRBs in the SCG;
(F) resume a part or all of the SRBs and/or the DRBs in the SCG;
(G) change a primary path of Split SRB and/or Split DRB to a state before suspension. Alternatively, reconfigure the primary path by using a configuration included in the first configuration;
(H) activate PDCP Duplication in a case that PDCP Duplication is configured;
(I) not reset the MAC of the SCG. Alternatively, reset the MAC of the SCG, and reconfigure the MAC by using a configuration related to the MAC included in the first configuration;
(J) reestablish each RLC of the SCG;
(K) perform data recovery in the PDCP of the SCG;
(L) resume or restart a timer used for periodic reporting such as BSR and PHR. Alternatively, reconfigure the timer by using a configuration included in the first configuration.

Examples of the first configuration and the second configuration will be described.

For example, the first configuration may be a part of configuration immediately applied to (reconfigured for) the terminal apparatus in a case that an RRC message is received from the base station apparatus. The first configuration may be retained in the terminal apparatus, and may be applied to the terminal apparatus again based on another trigger (for example, time of leaving the dormancy of the SCG).

The second configuration may be a configuration retained in the terminal apparatus in a case that an RRC message is received from the base station apparatus, and may be a configuration applied to the terminal apparatus based on another trigger (for example, time of entering the dormancy of the SCG).

The first configuration and the second configuration may include a part or all of configurations (information elements) related to a cell group. For example, a part or all of the configurations of the following (A) to (B) included in a configuration (CellGroupConfig information element) of the cell group may be included:
(A) configuration (MAC-CellGroupConfig) of the MAC of the cell group including a configuration of DRX;
(B) configuration (SpCellConfig, SCellConfig) related to the SpCell and/or the SCell including a configuration of the bandwidth part and the PUCCH.

The configuration of DRX may include a configuration related to a cycle of DRX. For example, for the first configuration, any value up to 640 ms may be configured as a configuration of a short cycle of DRX, and for the second configuration, a value greater than the short cycle configured in the first configuration may be configured as the configuration of the short cycle of DRX. As the configuration of DRX, in the first configuration, a configuration included in MAC-CellGroupConfig included in the CellGroupConfig information element may be used. As the configuration of DRX, in the second configuration, a configuration included in an information element related to an SCG dormancy configuration included in the CellGroupConfig information element may be used.

Values of parameters applied in a case of entering the dormancy of the SCG, such as information of the configuration of DRX and the partial band, may be included in the information element related to the SCG dormancy configuration, and the information element related to the SCG dormancy configuration may be included in the CellGroupConfig information element as the second configuration.

The configuration of DRX applied in a case of entering the dormancy of the SCG may be included in existing MAC-CellGroupConfig, and the configuration of the partial band applied in a case of entering the dormancy of the SCG may be included in existing SpCellConfig. The configuration of the bandwidth part may include, for example, configurations of DRX different between the first configuration and the second configuration. With this, the configuration of DRX for the BWP used in the dormancy of the SCG can be performed. The configuration of DRX may be included in the configuration of the partial band of the second configuration, and the configuration of DRX included in the configuration of the MAC may be used as the first configuration.

Figure 9:
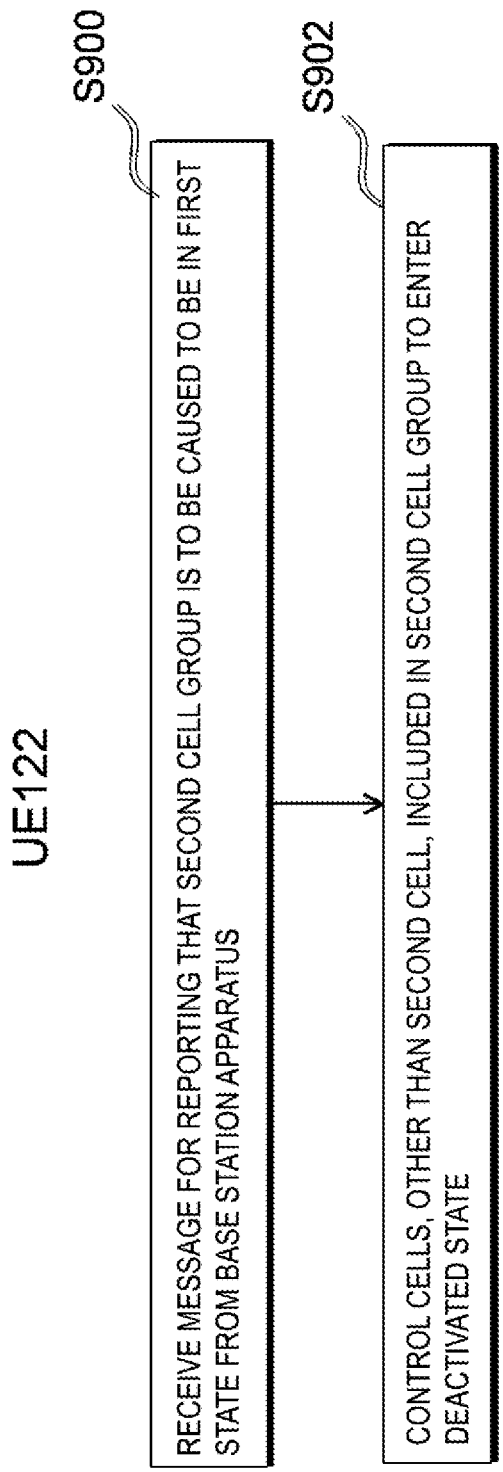
FIG. 9 is an example of processing related to dormancy of an SCG according to an embodiment of the present invention.

FIG. 9 is a diagram illustrating an example of an embodiment. In FIG. 9, the UE 122 receives a message (RRC message) for reporting that the SCG is to be caused to be in a dormant state (first state) from the eNB 102 or the gNB 108 (Step S902). Based on the report, the UE 122 controls cells (that is, SCells), other than the SpCell (second cell), of the SCG to enter the deactivated state.

Through the above operation, in the processing for causing the SCG to be dormant, efficient state change can be performed without independently transmitting the MAC CE for changing the state of the SCells of the SCG to the deactivated state. In a case that the dormancy of the SCG is performed based on an RRC message, conventionally, configuration of the initial state is performed in the RRC layer and the state change is performed in the MAC layer; however, through the above operation, the state change of the SCG can be efficiently performed with a mismatch between an indication from the RRC layer and an indication from the MAC layer being avoided.

Here, the PDCCH indicating leaving from the dormant BWP will be described.

For example, in a case that the SpCell is in the dormant state (state in which the dormant BWP is activated), the UE may monitor the PDCCH in the Active BWP of the SpCell in order to detect a certain DCI format (for example, DCI format 2_6). A CRC of the DCI format may be scrambled with a certain RNTI (for example, a PS-RNTI). The UE configured with the dormancy SCell group determines switching of the Active DL BWP, based on bitmap information included in a payload of DCI format 2_6. For example, in a case that a certain bit of the bitmap is associated with one dormancy SCell group and the bit is 1, BWP switching may be performed to switch to another BWP configured in advance in a case that the Active DL BWP is the dormant BWP, and the BWP may remain the same in a case that the Active DL BWP is not the dormant BWP. In a case that the bit is 0, BWP switching may be performed such that the Active DL BWP is the dormant BWP.

In a case of a system in which discontinuous reception is configured in the SpCell in the dormant state of the SpCell, the UE need not monitor the PDCCH for the purpose of detecting DCI format 2_6 in the active time of DRX.

In the case of the system in which discontinuous reception is configured in the SpCell in the dormant state of the SpCell, the UE configured with discontinuous reception (DRX) in the SpCell may monitor the PDCCH in the Active BWP of the SpCell for the purpose of detecting certain DCI formats (for example, DCI formats 0_1 and 1_1) in the active time of DRX. A CRC of the DCI formats may be scrambled with a certain RNTI (for example, a C-RNTI or an MCS-C-RNTI). The UE configured with the dormancy SCell group determines switching of the Active DL BWP, based on bitmap information included in a payload of DCI format 0_1 or DCI format 1_1. For example, in a case that a certain bit of the bitmap is associated with one dormancy SCell group and the bit is 1, BWP switching may be performed to switch to another BWP configured in advance in a case that the Active DL BWP is the dormant BWP, and the BWP may remain the same in a case that the Active DL BWP is not the dormant BWP. In a case that the bit is 0, BWP switching may be performed such that the Active DL BWP is the dormant BWP. The "another BWP configured in advance" may be a BWP different from the "another BWP configured in advance" used in the description for DCI format 2_6.

Outside the active time of DRX, the UE need not monitor the PDCCH for the purpose of detecting DCI format 0_1 and DCI format 1_1.

To monitor the PDCCH indicating leaving from the dormant BWP may be to monitor the PDCCH for the purpose of detecting DCI format 2_6. In this case, monitoring of the PDCCH for the purpose of detecting other DCI formats need not be performed.

In the case of the system in which discontinuous reception is configured in the SpCell in the dormant state of the SpCell, to monitor the PDCCH indicating leaving from the dormant BWP may be to monitor the PDCCH for the purpose of detecting DCI format 2_6 outside the active time of DRX, and to monitor the PDCCH for the purpose of detecting DCI format 0_1 and DCI format 1_1 in the active time of DRX. In this case, monitoring of the PDCCH for the purpose of detecting other DCI formats need not be performed.

In a case that the SCG is in the dormant state, all of uplink transmissions may be stopped in the SCG. In this case, information related to the SCG may be transmitted in another cell group (for example, the MCG). Alternatively, the information related to the SCG may be transmitted in the SCG that has left the dormant state. In a case that the SCG is in the dormant state, a part or all of uplink transmissions may be allowed in the SCG. Here, an example in which uplink transmission is performed in the SCG in a case that the SCG is in the dormant state will be described.

For example, a beam failure recovery of a case in which beam control (beam management) including the beam failure recovery is performed in the SpCell of the SCG in the dormant state will be described.

In the MAC entity, a beam failure recovery procedure may be configured for each serving cell by the RRC. Note that the beam failure recovery procedure may be configured and/or performed only in the SpCell in the SCG in the dormant state, or the beam failure recovery procedure may be configured and/or performed in the SpCell and a part or all of the SCells in the SCG in the dormant state. The beam failure is detected by counting a beam failure instance report reported from a lower layer (PHY layer) to the MAC entity. The MAC entity may perform a part or all of the processing of the following (A), (B), and (C) in each serving cell for beam failure detection:

(A) in a case that the beam failure instance report is received from a lower layer, start or restart the timer (beamFailureDetection Timer) and increment a counter (BFI-COUNTER) by 1. In a case that a value of BFI_COUNTER is equal to or larger than a configured threshold (beamFailureInstanceMaxCount), perform the processing of the following (A-1):

(A-1) in a case that the serving cell is the SCell, trigger a beam failure recovery (BFR) for the serving cell, otherwise, initiate the random access procedure in the SpCell. Note that, in a case that the beam recovery is not triggered in the SCell, the beam failure recovery for the SCell need not be triggered here. In other words, only in a case that the serving cell is the SpCell, the processing of initiating the random access procedure may be performed in the SpCell;

(B) in a case that beamFailureDetectionTimer for the serving cell expires, or a configuration of beamFailure-Detection Timer, beamFailureInstanceMaxCount, and/or a reference signal for beam failure detection is changed by an upper layer, configure BFI_COUNTER to 0;

(C) in a case that the serving cell is the SpCell, and the random access procedure successfully completed, configure BFI_COUNTER to 0, stop the timer (beamFailureRecoveryTimer), and consider that the beam failure recovery procedure successfully completed. Otherwise, that is, in a case that the serving cell is the SCell, the PDCCH addressed to the C-RNTI indicating a new uplink grant for transmitting information for the beam failure recovery of the SCell (for example, information included in an SCell BFR MAC CE) is received, or the SCell is in the deactivated state, configure BFI_COUNTER to 0, consider that the beam failure recovery procedure successfully completed, and cancel all of the beam failure recoveries (BFRs) triggered for the serving cell.

In a case that at least one beam failure recovery (BFR) is triggered by the beam failure recovery procedure, and it is not cancelled, the MAC entity triggers a scheduling request for the SCell beam failure recovery as necessary.

In a case that the scheduling request is triggered, and valid PUCCH resources for the Pending scheduling request are not configured, the MAC entity of the SCG initiates the random access procedure in the SpCell.

As described above, the random access procedure in the SpCell (PSCell) may be initiated in the dormant SCG by the trigger of the scheduling request for transmitting the MAC PDU including the MAC CE from the MAC entity, or by the MAC entity directly. In this case, the MAC PDU may not include the MAC SDU.

Meanwhile, the random access procedure in the SpCell (PSCell) may be initiated in the dormant SCG by the trigger of the scheduling request for transmitting the MAC PDU including data (MAC SDU) from an upper layer, such as user data and an RRC message.

Here, in the SpCell of a certain cell group, a state in which transmission of the UL-SCH and transmission of the RACH can be performed is referred to as the first state. The first state may be a state in which, in the SpCell of the cell group, transmission of the RACH can be performed, and/or the PDCCH addressed to the C-RNTI, the MCS-C-RNTI, and/or the CS-RNTI indicating an uplink grant for UL-SCH transmission is monitored. The first state may be a state in which a first BWP is activated in the SpCell of the cell group, and the PDCCH addressed to the C-RNTI, the MCS-C-RNTI, and/or the CS-RNTI indicating an uplink grant is monitored in the first BWP. The first state may be a state in which measurement of channel state information (CSI) for the first BWP is performed. The first state may be a state in which discontinuous reception (DRX) is configured.

The state in which the PDCCH addressed to the C-RNTI, the MCS-C-RNTI, and/or the CS-RNTI indicating an uplink grant for UL-SCH transmission is monitored may include a state in which the Active BWP of the SpCell of the cell group is not the dormant BWP. The first state may be a state in which the cell group (SCG) is resumed from the dormant state. The first state may be a state in which the cell group (SCG) is not the dormant state.

For example, the first state may be a state of transitioning from a second state in a case that the random access procedure due to the scheduling request triggered for transmitting the MAC PDU included in the MAC SDU is initiated. For example, the first state may be a state of transitioning from the second state in a case that resumption from the dormant state is indicated from the RRC entity. For example, the first state may be a state in which the PDCCH indicating leaving from the dormant BWP is not monitored.

In the SpCell of a certain cell group, a state in which transmission of the UL-SCH and transmission of the RACH are stopped is referred to as the second state. The second state may be a state in which, in the SpCell of the cell group, the RACH is not transmitted, and/or the PDCCH addressed to the C-RNTI, the MCS-C-RNTI, and/or the CS-RNTI indicating an uplink grant for UL-SCH transmission is monitored. The second state may be a state in which a second BWP is activated in the SpCell of the cell group, and the PDCCH addressed to the C-RNTI, the MCS-C-RNTI, and/or the CS-RNTI indicating an uplink grant for UL-SCH transmission and the PDCCH indicating leaving from the dormant BWP are not monitored in the second BWP. The second state may be a state in which the second BWP is activated in the SpCell of the cell group, and only the PDCCH indicating leaving from the dormant BWP is monitored in the second BWP. The second state may be a state in which measurement of channel state information (CSI) for the second BWP is performed.

The second state may be a state in which the Active BWP of the SpCell is the dormant BWP.

In the SpCell of a certain cell group, a state in which limited transmission of the UL-SCH and transmission of the RACH can be performed is referred to as a third state. The third state may be a state in which, in the SpCell of the cell group, the RACH can be transmitted and the PDCCH addressed to the C-RNTI, the MCS-C-RNTI, and/or the CS-RNTI indicating an uplink grant is monitored for the limited UL-SCH transmission. The third state may be a part of the first state in which the cell group (SCG) is resumed from the dormant state, or may be a state different from the first state in which the cell group (SCG) is resumed from the dormant state.

For example, the third state may be a state of transitioning from the second state in a case that the random access procedure triggered by the MAC entity is initiated. For example, the third state may be a state of transitioning from the second state in a case that the value of BFI_COUNTER is equal to or larger than the configured threshold. For example, in a case that the value of BFI_COUNTER is equal to or larger than the configured threshold, and the random access procedure is initiated in the PSCell, the third state may be a state of transitioning from the second state. For example, in a case that the value of BFI_COUNTER is equal to or larger than the configured threshold, and the BFR is triggered in the SCell, the third state may be a state of transitioning from the second state.

The third state may be a state in which a third BWP is activated in the SpCell of the cell group, and the PDCCH indicating leaving from the dormant BWP is monitored in the third BWP. The third state may be a state in which the PDCCH addressed to the C-RNTI, the MCS-C-RNTI, and/or the CS-RNTI indicating an uplink grant is not monitored in the third BWP. The third state may be a state in which measurement of channel state information (CSI) for the third BWP is performed. In a case that the UE receives the PDCCH indicating leaving from the dormant BWP for its station in the third BWP, the UE may switch the BWP to the BWP configured in advance (for example, the first BWP).

For example, the third state may be a state of transitioning from the second state in a case that the random access procedure due to the scheduling request triggered for transmitting the MAC PDU not including the MAC SDU is initiated. For example, the third state may be a state of transitioning from the second state in a case that the random access procedure due to the scheduling request triggered for transmitting the MAC PDU including a specific MAC CE is initiated. The specific MAC CE may include the BFR MAC CE. For example, the third state may be a state of transitioning from the second state in a case that the MAC PDU including the specific MAC CE does not include the MAC SDU.

Figure 10:
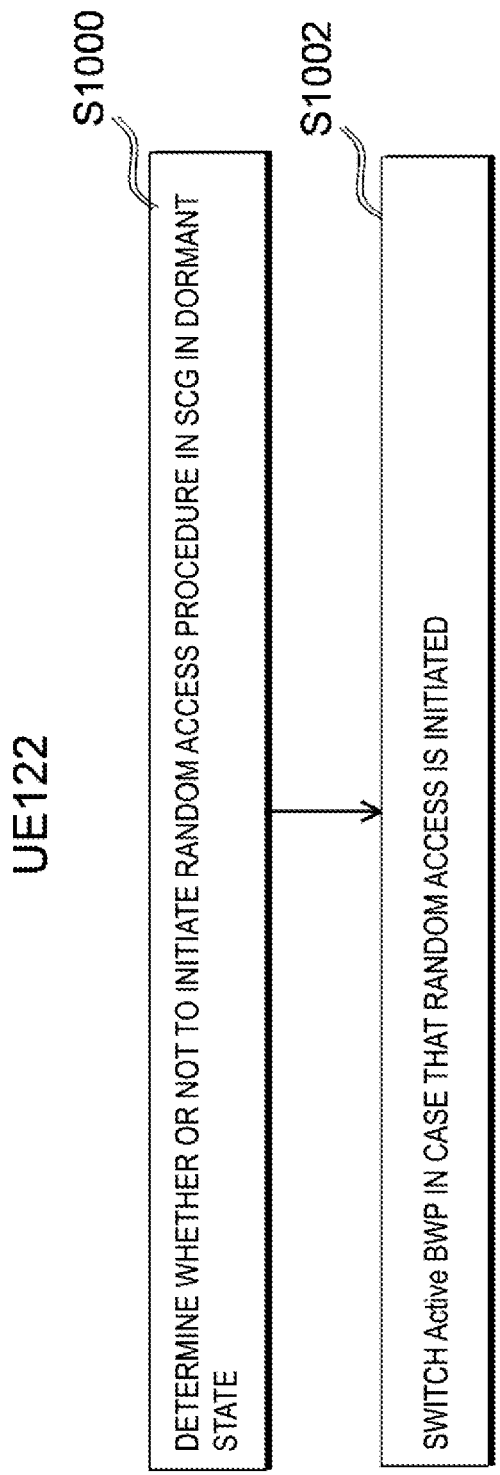
FIG. 10 is an example of processing related to dormancy of an SCG according to an embodiment of the present invention.

For example, as illustrated in FIG. 10, the UE may determine whether or not to initiate the random access procedure in the SCG in the dormant state (Step S1000), and in a case of initiating the random access, the UE may switch the Active BWP to another BWP (for example, the third BWP) (Step S1002).

For example, the third state may be a state of transitioning from the second state in a case that the random access procedure for requesting an uplink grant is performed.

For the UE, the BWP (first BWP) that becomes Active in a case of resuming from the dormant state of the SCG and entering the first state, the BWP (second BWP) that becomes Active in the second state, and the BWP (third BWP) that becomes Active in the third state may be independently configured. For each of the first to third BWPs, one or more BWPs may be configured. Each of the first to third BWPs may be configured in the downlink BWP and/or the uplink BWP.

Transitioning to the first state and the first BWP becoming Active may be the same meaning. Transitioning to the second state and the second BWP becoming Active may be the same meaning. Transitioning to the third state and the third BWP becoming Active may be the same meaning.

Transitioning to the first state and the BWP other than the first BWP becoming a deactivated BWP may be the same meaning. Transitioning to the second state and the BWP other than the second BWP becoming an activated BWP may be the same meaning. Transitioning to the third state and the BWP other than the third BWP becoming an activated BWP may be the same meaning.

A part or all of the first to third BWPs may be configured for the UE by an RRC message. The configuration of the second BWP need not include a part or all of parameters necessary for monitoring of the PDCCH as described above. The configuration of the second BWP need not include the configuration of the uplink BWP. The configuration of the third BWP may include a parameter necessary for monitoring of the PDCCH for receiving at least a response for a random access preamble (random access response). The configuration of the third BWP may include the configuration of the uplink BWP. The configuration of the uplink BWP may include information necessary for transmission of the random access preamble.

As another example, the dormant state of the SCG may be the third state. In other words, the SCG entering the dormant state and transitioning to the third state may be the same meaning. In this case, the second state may be defined as another state different from the dormant state of the SCG, or the second state need not be present.

In this manner, necessary uplink transmission can be triggered in the dormant state of the SCG as well. In the dormant state of the SCG, power can be reduced by monitoring only necessary signals.

An MCG failure will be described. The purpose of the procedure may be to notify the network of an MCG failure (that is, an MCG radio link failure) that the UE has encountered. The UE in RRC_CONNECTED for which security of the AS layer of the SRB2 is in an activated state and at least one DRB is set up may initiate a fast MCG link recovery procedure in order to maintain the RRC connection without re-establishment.

Figure 11:
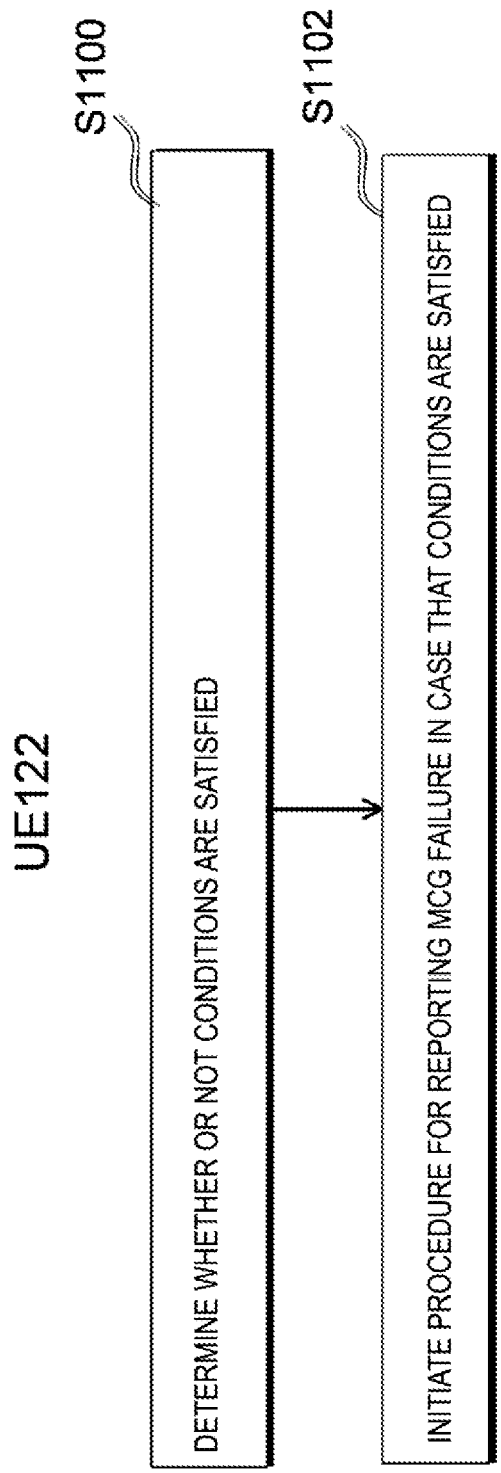
FIG. 11 is an example of processing related to dormancy of an SCG according to an embodiment of the present invention.

As illustrated in FIG. 11, in a case that a part or all of the conditions of the following (A) to (D) are satisfied, and the condition of (E) is satisfied (Step S1100), the UE configured with a split SRB1 or SRB3 may initiate a procedure for reporting the MCG failure (Step S1102):

(A) transmission of both of the MCG and the SCG is not suspended;
(B) a timer T316 is configured;
(C) the SCG is not in a fourth state;
(D) the active BWP of the SpCell of the SCG is not the dormant BWP;
(E) in a case that the radio link failure of the MCG is detected in a state in which the timer T316 is not running.

Note that, in a case that the procedure for reporting the MCG failure is initiated, MCG transmission for all of the SRBs and the DRBs except the SRB0 is suspended. In a case that the procedure for reporting the SCG failure is initiated, SCG transmission for all of the SRBs and the DRBs is suspended.

The timer T316 is a timer that is started in a case that an MCG failure information message is transmitted, and the timer is stopped in a case that transmission in the MCG is recovered, an RRCRelease message is received, or a re-establishment procedure is initiated.

The fourth state may be a state in which a fourth BWP is activated in the SpCell of the cell group, only the PDCCH indicating leaving from the dormant BWP is monitored in the fourth BWP, and measurement of channel state information (CSI) for the fourth BWP is performed. The fourth state may be a state in which the fourth BWP is activated in the SpCell of the cell group, the C-RNTI is not monitored in the PDCCH in the fourth BWP, and measurement of channel state information (CSI) for the fourth BWP is performed. The fourth state may be the third state described above.

In a case that the procedure for reporting the MCG failure is initiated, the UE suspends MCG transmission for all of the SRBs and the DRBs except the SRB0, resets the MAC of the MCG, and starts transmission of the MCG failure information message.

In this manner, the procedure for reporting the MCG failure can be controlled, with the dormant state of the SCG being taken into consideration.

Another example of the MCG failure will be described. In the present example, the UE considers that transmission of the SCG has been suspended in a case that the active BWP of the SpCell of the SCG is the dormant BWP.

In a case that a part or all of the conditions of the following (A) to (B) are satisfied, and the condition of (C) is satisfied, the UE configured with a split SRB1 or SRB3 may transition to the third state or the first state and initiate the procedure for reporting the MCG failure:

(A) transmission of both of the MCG and the SCG is not suspended;
(B) a timer T316 is configured;
(C) in a case that the radio link failure of the MCG is detected in a state in which the timer T316 is not running.

In this manner, the procedure for reporting the MCG failure can be controlled without adding a new condition.

Figure 12:
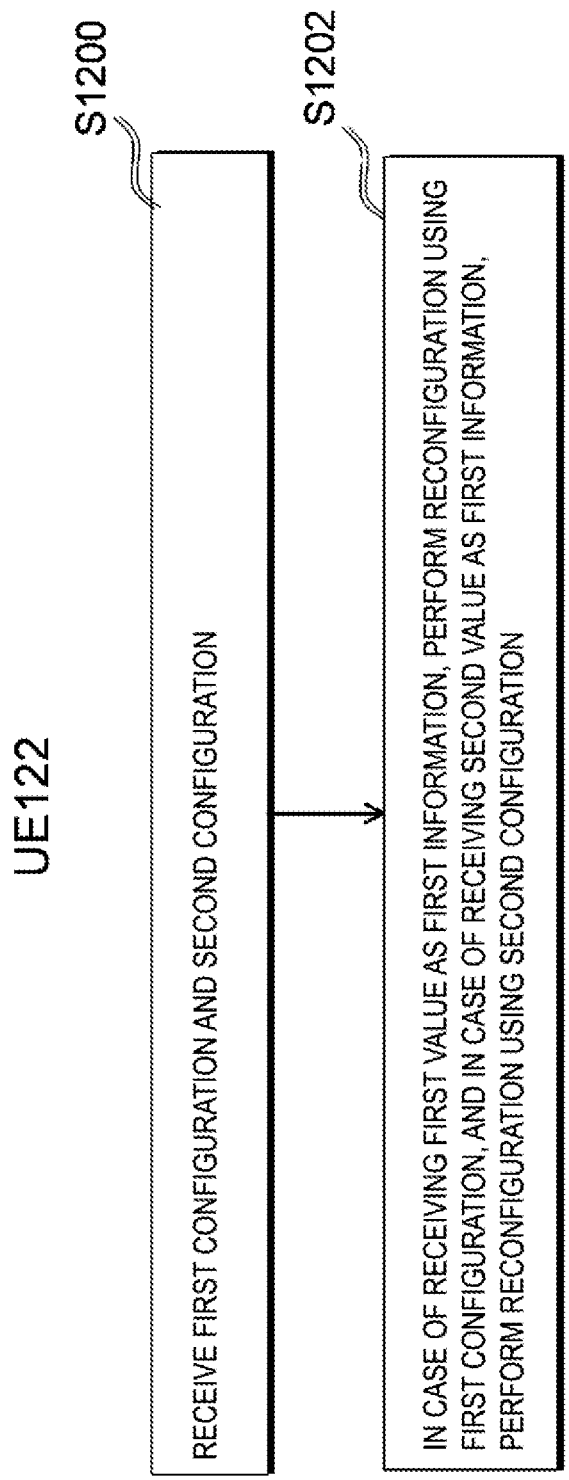
FIG. 12 is an example of processing related to dormancy of an SCG according to an embodiment of the present invention.

FIG. 12 is a diagram illustrating an example of an embodiment. In FIG. 12, the UE 122 receives the first configuration and the second configuration from the eNB 102 or the gNB 108 (Step S1200). The first configuration and the second configuration may be reported using different RRC messages, or may be reported using one RRC message including the first configuration and the second configuration.

The UE 122 receives the first information from the eNB 102 or the gNB 108, and in a case that the UE 122 receives a first value as the first information, the UE 122 performs reconfiguration using the first configuration, and in a case that the UE 122 receives a second value as the first information, the UE 122 performs reconfiguration using the second configuration (Step S1202).

As described above, owing to the first information, for example, which of the multiple configurations reported in advance is used to perform reconfiguration can be indicated in a case that the UE 122 enters and leaves SCG suspend, and efficient control can be performed in a case that entering and leaving are frequently repeated.

In a case that reconfiguration based on the first information is performed, the MAC may not be reset in the second cell group. In this case, the RLC may be reestablished. In this case, data recovery of the PDCP may be performed. These processing may be performed in a case that the first information includes a specific value.

With the processing being performed as described above, for example, in a case of entering SCG suspend, beam control and the like for maintaining a synchronization state can be continuously performed.

In a case that reconfiguration based on the first information is performed, a part of timers used in the MAC in the second cell group may be suspended, stopped, or released. For example, by preventing operations of a timer for periodic reporting, such as a timer for periodically reporting a buffer state and a timer for periodically reporting a power headroom, unnecessary uplink transmission in SCG suspend can be reduced.

With the processing being performed as described above, for example, in a case of entering SCG suspend, beam control and the like for maintaining a synchronization state can be continuously performed. For example, in a case of leaving SCG suspend, beam control and the like for maintaining a synchronization state can be continuously performed.

Figure 5:
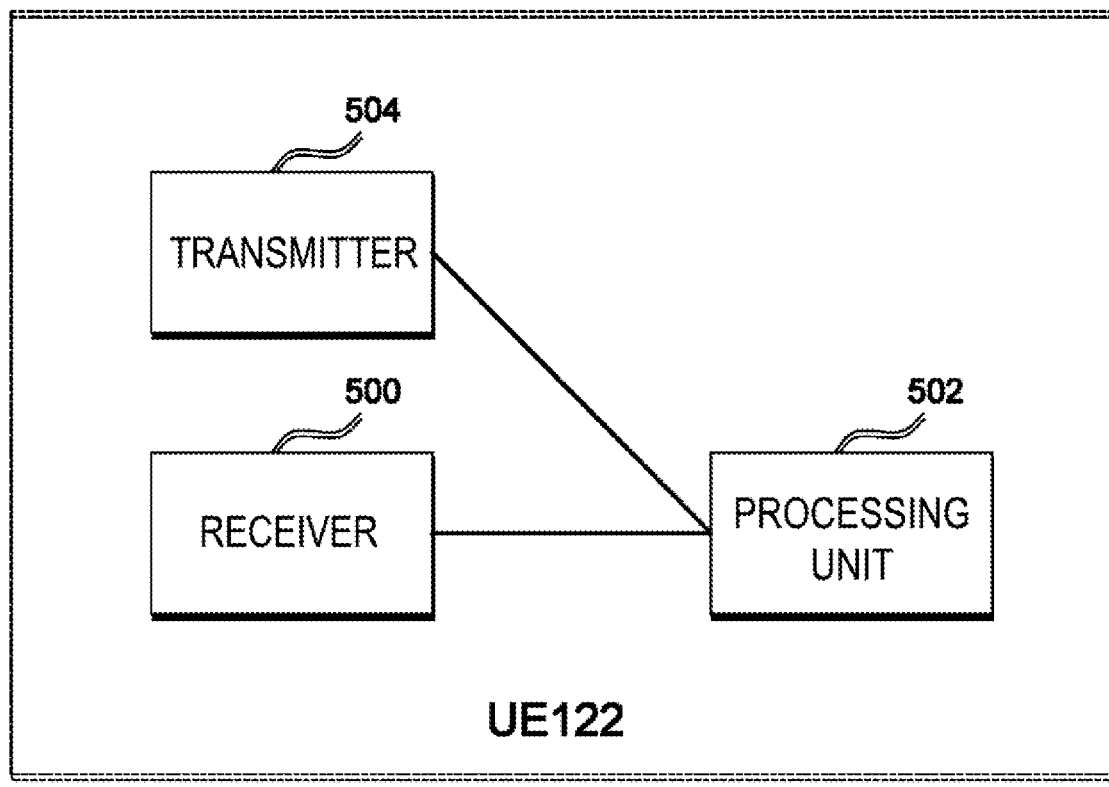
FIG. 5 is a block diagram illustrating a configuration of the terminal apparatus according to each embodiment of the present invention.

FIG. 5 is a block diagram illustrating a configuration of the terminal apparatus (UE 122) according to each embodiment of the present invention. Note that FIG. 5 illustrates only the main components closely related to an aspect of the present invention in order to avoid complexity of description.

The UE 122 illustrated in FIG. 5 includes a receiver 500 configured to receive an RRC message and the like from a base station apparatus, a processing unit 502 configured to perform processing in accordance with a part or all of pieces of configuration information such as various information elements (IEs), various fields, and various conditions included in the message received, and a transmitter 504 configured to transmit the RRC message and the like to the base station apparatus. The above-described base station apparatus may be the eNB 102 or the gNB 108. The processing unit 502 may include some or all of the functions of various layers (e.g., a physical layer, a MAC layer, an RLC layer, a PDCP layer, an RRC layer, and an NAS layer). In other words, the processing unit 502 may include some or all of a physical layer processing unit, a MAC layer processing unit, an RLC layer processing unit, a PDCP layer processing unit, an RRC layer processing unit, and an NAS layer processing unit.

The processing unit 502 may include a retainer that retains the first configuration and the second configuration applied to (reconfigured for) one or multiple parameters of the UE 122. The processing unit 502 may include a controller that controls a part or all of processing of functions of various layers.

Figure 6:
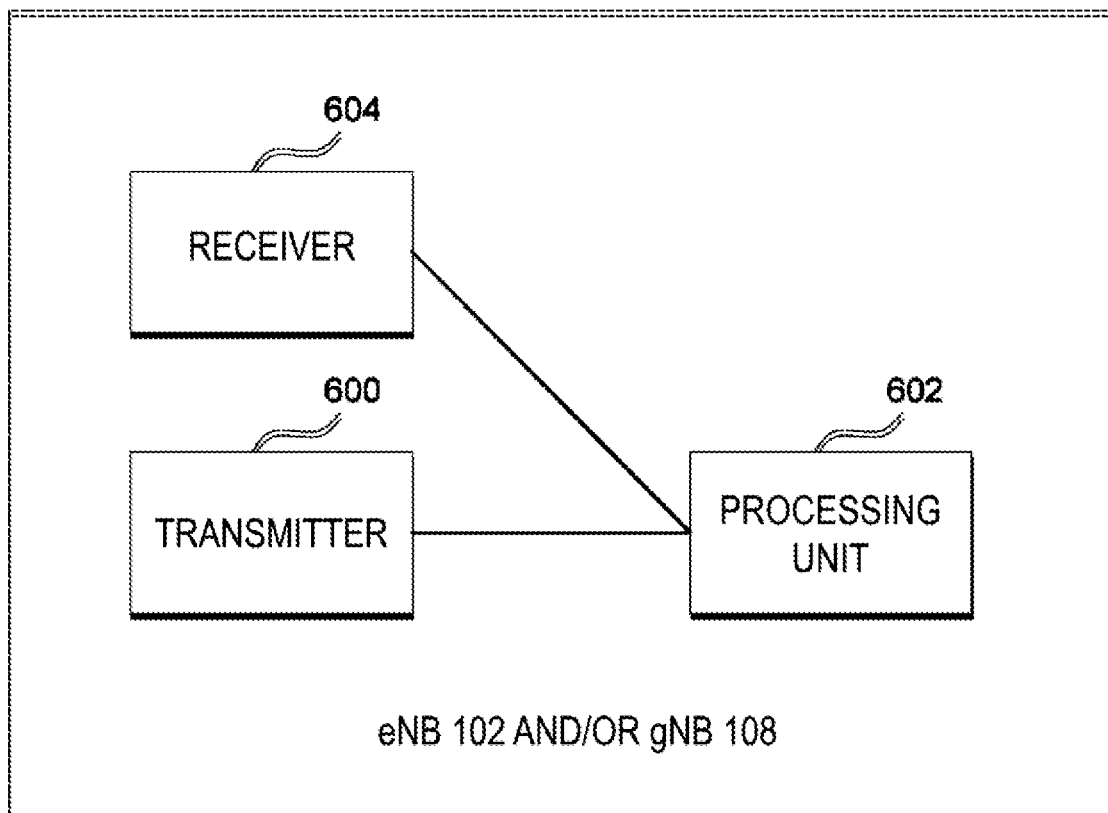
FIG. 6 is a block diagram illustrating a configuration of the base station apparatus according to each embodiment of the present invention.

FIG. 6 is a block diagram illustrating a configuration of the base station apparatus according to each embodiment of the present invention. Note that FIG. 6 illustrates only the main components closely related to one aspect of the present invention in order to avoid complexity of description. The above-described base station apparatus may be the eNB 102 or the gNB 108.

The base station apparatus illustrated in FIG. 6 includes a transmitter 600 configured to transmit an RRC message and the like to the UE 122, a processing unit 602 configured to create an RRC message including a part or all of pieces of configuration information such as various information elements (IEs), various fields, and various conditions and to transmit the RRC message to the UE 122 to cause the processing unit 502 of the UE 122 to perform processing, and a receiver 604 configured to receive the RRC message and the like from the UE 122. Furthermore, the processing unit 602 may include some or all of the functions of various layers (e.g., the physical layer, the MAC layer, the RLC layer, the PDCP layer, the RRC layer, and the NAS layer). In other words, the processing unit 602 may include some or all of the physical layer processing unit, the MAC layer processing unit, the RLC layer processing unit, the PDCP layer processing unit, the RRC layer processing unit, and the NAS layer processing unit.

In the example of each processing or the example of the flow of each processing in the above description, a part or all of the steps need not be performed. In the example of each processing or the example of the flow of each processing in the above description, order of the steps may be different. In the example of each processing or the example of the flow of each processing in the above description, a part or all of the processing in each step need not be performed. In the example of each processing or the example of the flow of each processing in the above description, order of processing in each step may be different.

Various aspects of the terminal apparatus according to embodiments of the present invention will be described below.

(1) A first aspect of the present invention is a terminal apparatus configured with a first cell group and a second cell group. The terminal apparatus includes: a receiver configured to receive a first configuration applied to the second cell group and receive a second configuration applied to the second cell group; a retainer configured to retain the first configuration and the second configuration that are applied to the second cell group in a case that the second configuration applied to the second cell group is received; and a controller configured to perform radio resource control. The receiver receives first information. The controller performs reconfiguration using the first configuration in a case that a first value is received as the first information, performs reconfiguration using the second configuration in a case that a second value is received as the first information, and does not reset MAC and reestablishes RLC in the second cell group in a case of performing reconfiguration based on the first information.

(2) In the first aspect, the first configuration and the second configuration each include an identical information element.

(3) A second aspect of the present invention is a base station apparatus for communicating with a terminal apparatus. The base station apparatus includes: a transmitter configured to transmit a first configuration applied to a second cell group and transmit a second configuration applied to the second cell group; and a controller configured to perform radio resource control. The transmitter transmits first information. The controller transmits a first value as the first information to cause the terminal apparatus to perform reconfiguration using the first configuration, transmits a second value as the first information to cause the terminal apparatus to perform reconfiguration using the second configuration, and performs the radio resource control on an assumption that the terminal apparatus does not reset MAC and reestablishes RLC in the second cell group, in a case of causing the terminal apparatus to perform reconfiguration based on the first information.

(4) A third aspect of the present invention is a method applied to a terminal apparatus configured with a first cell group and a second cell group. The method includes: receiving a first configuration applied to the second cell group, receiving a second configuration applied to the second cell group, and receiving first information; retaining the first configuration and the second configuration that are applied to the second cell group in a case that the second configuration applied to the second cell group is received; and performing radio resource control. Reconfiguration using the first configuration is performed in a case that a first value is received as the first information. Reconfiguration using the second configuration is performed in a case that a second value is received as the first information. MAC is not reset and RLC is reestablished in the second cell group, in a case that reconfiguration based on the first information is performed.

(5) A fourth aspect of the present invention is a method applied to a base station apparatus for communicating with a terminal apparatus. The method includes: transmitting a first configuration applied to a second cell group, transmitting a second configuration applied to the second cell group, and transmitting first information; and performing radio resource control. A first value is transmitted as the first information to cause the terminal apparatus to perform reconfiguration using the first configuration. A second value is transmitted as the first information to cause the terminal apparatus to perform reconfiguration using the second configuration. The radio resource control is performed on an assumption that the terminal apparatus does not reset MAC and reestablishes RLC in the second cell group, in a case that the terminal apparatus is caused to perform reconfiguration based on the first information.

(6) A fifth aspect of the present invention is an integrated circuit implemented in a terminal apparatus configured with a first cell group and a second cell group, the integrated circuit causing the terminal apparatus to perform: receiving a first configuration applied to the second cell group, receiving a second configuration applied to the second cell group, and receiving first information; retaining the first configuration and the second configuration that are applied to the second cell group in a case that the second configuration applied to the second cell group is received; and performing radio resource control. Reconfiguration using the first configuration is performed in a case that a first value is received as the first information. Reconfiguration using the second configuration is performed in a case that a second value is received as the first information. MAC is not reset and RLC is reestablished in the second cell group in a case that reconfiguration based on the first information is performed.

(7) A sixth aspect of the present invention is an integrated circuit implemented in a base station apparatus for communicating with a terminal apparatus, the integrated circuit causing the base station apparatus to perform: transmitting a first configuration applied to a second cell group, transmitting a second configuration applied to the second cell group, and transmitting first information; and performing radio resource control. A first value is transmitted as the first information to cause the terminal apparatus to perform reconfiguration using the first configuration. A second value is transmitted as the first information to cause the terminal apparatus to perform reconfiguration using the second configuration. The radio resource control is performed on an assumption that the terminal apparatus does not reset MAC and reestablishes RLC in the second cell group, in a case that the terminal apparatus is caused to perform reconfiguration based on the first information.

A program running on an apparatus according to an aspect of the present invention may serve as a program that controls a Central Processing Unit (CPU) and the like to cause a computer to operate in such a manner as to implement the functions of the above-described embodiments according to the aspect of the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope that does not depart from the gist of the present invention. Furthermore, for an aspect of the present invention, various modifications are possible within the scope of the claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

100 E-UTRA
102 eNB
104 EPC
106 NR
108 gNB
110 5GC
112, 114, 116, 118, 120, 124 Interface 122 UE
200, 300 PHY
202, 302 MAC
204, 304 RLC
206, 306 PDCP
208, 308 RRC
310 SDAP
210, 312 NAS
500, 604 Receiver
502, 602 Processing unit
504, 600 Transmitter

The invention claimed is:

1. A terminal apparatus comprising:
processing circuitry communicating, with a base station apparatus, via a master cell group (MCG) and a secondary cell group (SCG); and
receiving circuitry receiving a radio resource control (RRC) message, wherein;
the processing circuitry changes a state of the SCG from a normal state to a first state based on the RRC message that includes an indication to change the SCG to the first state, and
in a case that the state of the SCG is changed from the normal state to the first state:
an uplink transmission in the SCG is stopped,
a physical downlink control channel (PDCCH) is not monitored in a special cell (SpCell) of the SCG,
an SCG beam failure detection is performed, and
information related to the SCG beam failure detection is transmitted in the MCG.

2. A base station apparatus communicates with a terminal apparatus, the base station apparatus comprising:
transmission circuitry transmitting a radio resource control (RRC) message, wherein:
the base station apparatus causes the terminal apparatus to change a state of a secondary cell group (SCG) from a normal state to a first state based on the RRC message that includes an indication to change the SCG to the first state, and
in a case that the state of the SCG is changed from the normal state to the first state:
an uplink transmission in the SCG is stopped,
a physical downlink control channel (PDCCH) is not monitored in a special cell (SpCell) of the SCG,
an SCG beam failure detection is performed, and
information related to the SCG beam failure detection is transmitted in a master cell group (MCG).

3. A communication method performed by a terminal apparatus,
the communication method comprising:
communicating, with a base station apparatus, via a master cell group (MCG) and a secondary cell group (SCG); and
receiving a radio resource control (RRC) message; and
changing a state of the SCG from a normal state to a first state based on the RRC message that includes an indication to change the SCG to the first state, wherein
in a case that the state of the SCG is changed from the normal state to the first state;
an uplink transmission in the SCG is stopped,
a physical downlink control channel (PDCCH) is not monitored in a special cell (SpCell) of the SCG,
an SCG beam failure detection is performed, and
information related to the SCG beam failure detection is transmitted in the MCG.

* * * * *